United States Patent
Celestinos Arroyo et al.

(10) Patent No.: US 11,553,298 B2
(45) Date of Patent: Jan. 10, 2023

(54) AUTOMATIC LOUDSPEAKER ROOM EQUALIZATION BASED ON SOUND FIELD ESTIMATION WITH ARTIFICIAL INTELLIGENCE MODELS

(71) Applicant: SAMSUNG ELECTRONICS CO., LTD., Suwon-si (KR)

(72) Inventors: Adrian Celestinos Arroyo, Porter Ranch, CA (US); Yuan Li, Northridge, CA (US)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/170,610

(22) Filed: Feb. 8, 2021

(65) Prior Publication Data

US 2022/0256305 A1   Aug. 11, 2022

(51) Int. Cl.
*H04S 7/00*   (2006.01)

(52) U.S. Cl.
CPC .............. *H04S 7/307* (2013.01); *H04S 7/301* (2013.01)

(58) Field of Classification Search
None
See application file for complete search history.

(56) References Cited

U.S. PATENT DOCUMENTS

| | | |
|---|---|---|
| 8,121,302 B2 | 2/2012 | Skuruls |
| 9,641,952 B2 | 5/2017 | Fejzo et al. |
| 10,469,046 B2 | 11/2019 | Celestinos Arroyo |
| 10,559,316 B2 | 2/2020 | Cassidy et al. |
| 2007/0041600 A1 | 2/2007 | Zachman |
| 2017/0325023 A1* | 11/2017 | Nongpiur ............... H04R 1/406 |
| 2018/0262175 A1* | 9/2018 | Celestinos Arroyo ... H03G 3/32 |
| 2019/0103849 A1* | 4/2019 | Shaya ...................... H04R 3/04 |

(Continued)

FOREIGN PATENT DOCUMENTS

| | | |
|---|---|---|
| KR | 10-1602298 | 3/2016 |
| KR | 10-1647974 B1 | 8/2016 |
| KR | 10-2019-0069537 A | 6/2019 |

(Continued)

OTHER PUBLICATIONS

Peace, P. et al., "Moving Microphone Measurements for Room Response in Cinema", Journal of the Audio Engineering Society, May 14, 2018, pp. 1-10, AES e-Library, Italy.

(Continued)

*Primary Examiner* — James K Mooney
(74) *Attorney, Agent, or Firm* — Sherman IP LLP; Kenneth L. Sherman; Steven Laut

(57) ABSTRACT

One embodiment provides a computer-implemented method that includes acquiring, via at least one microphone, sound pressure data at one or more discrete frequencies obtained from a frequency response of a loudspeaker in a room. The sound pressure data is input into an artificial intelligence (AI) model that analyses and processes information, and that incorporates a relationship between the frequency response and at least one of an energy average (EA) in a listening area or a total sound power (TSP) produced by the loudspeaker. The AI model automatically estimates, without user interaction, the at least one of the EA in the listening area or the TSP produced by the loudspeaker.

20 Claims, 19 Drawing Sheets

(56) References Cited

U.S. PATENT DOCUMENTS

2020/0302949 A1  9/2020  Jeong et al.
2021/0021953 A1  1/2021  Kim et al.

FOREIGN PATENT DOCUMENTS

KR  10-2020-0115731 A  1/2020
KR  10-2021-0008788 A  1/2021

OTHER PUBLICATIONS

International Search Report & Written Opinion dated May 16, 2022 for International Application PCT/KR2022/001859 from Korean Intellectual Property Office, pp. 1-8, Republic of Korea {Machine-Translated}.

* cited by examiner

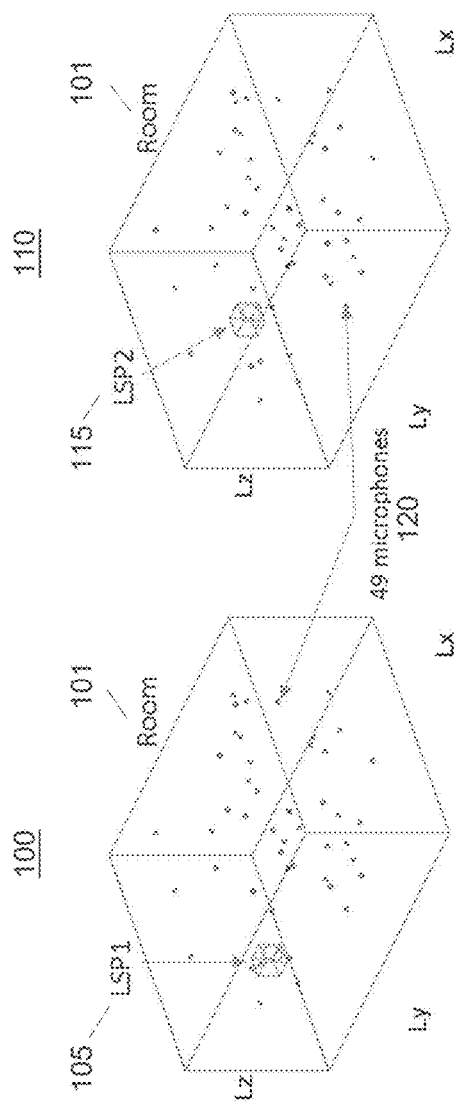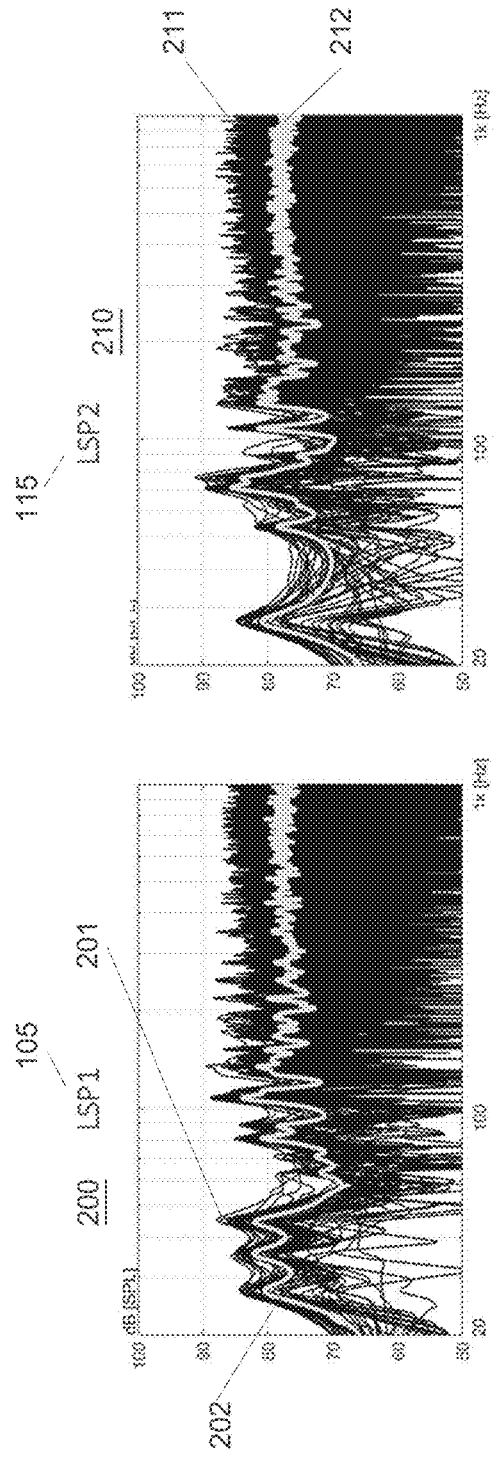
FIG. 1
FIG. 2A
FIG. 2B

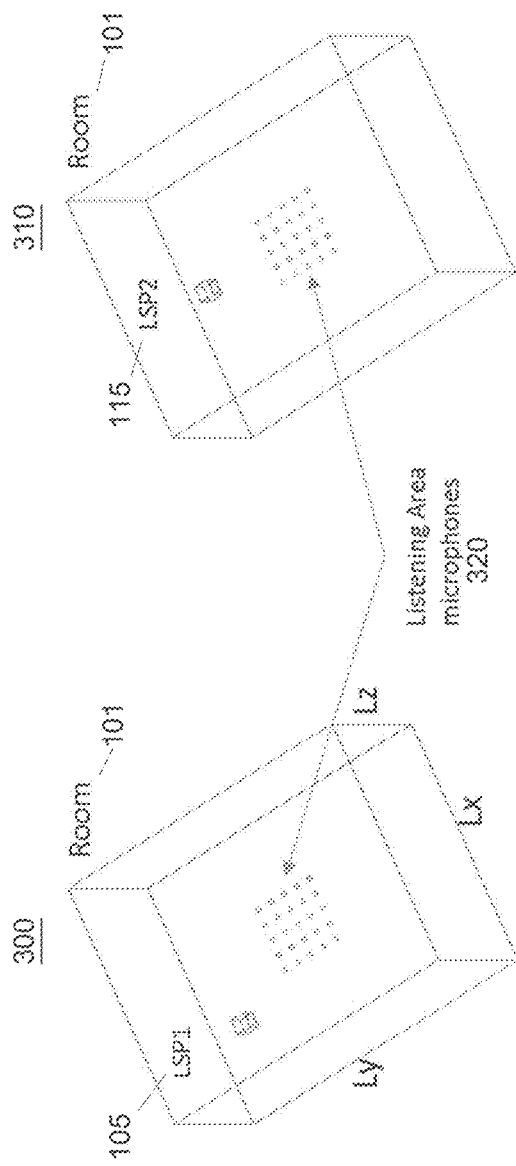
FIG. 3
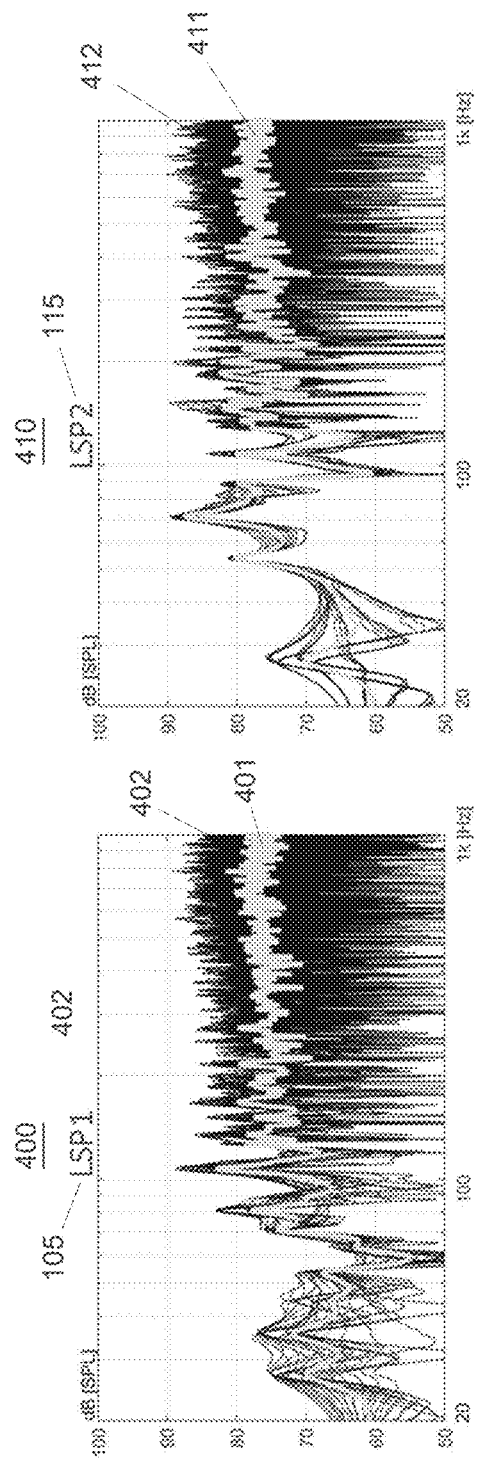
FIG. 4B
FIG. 4A

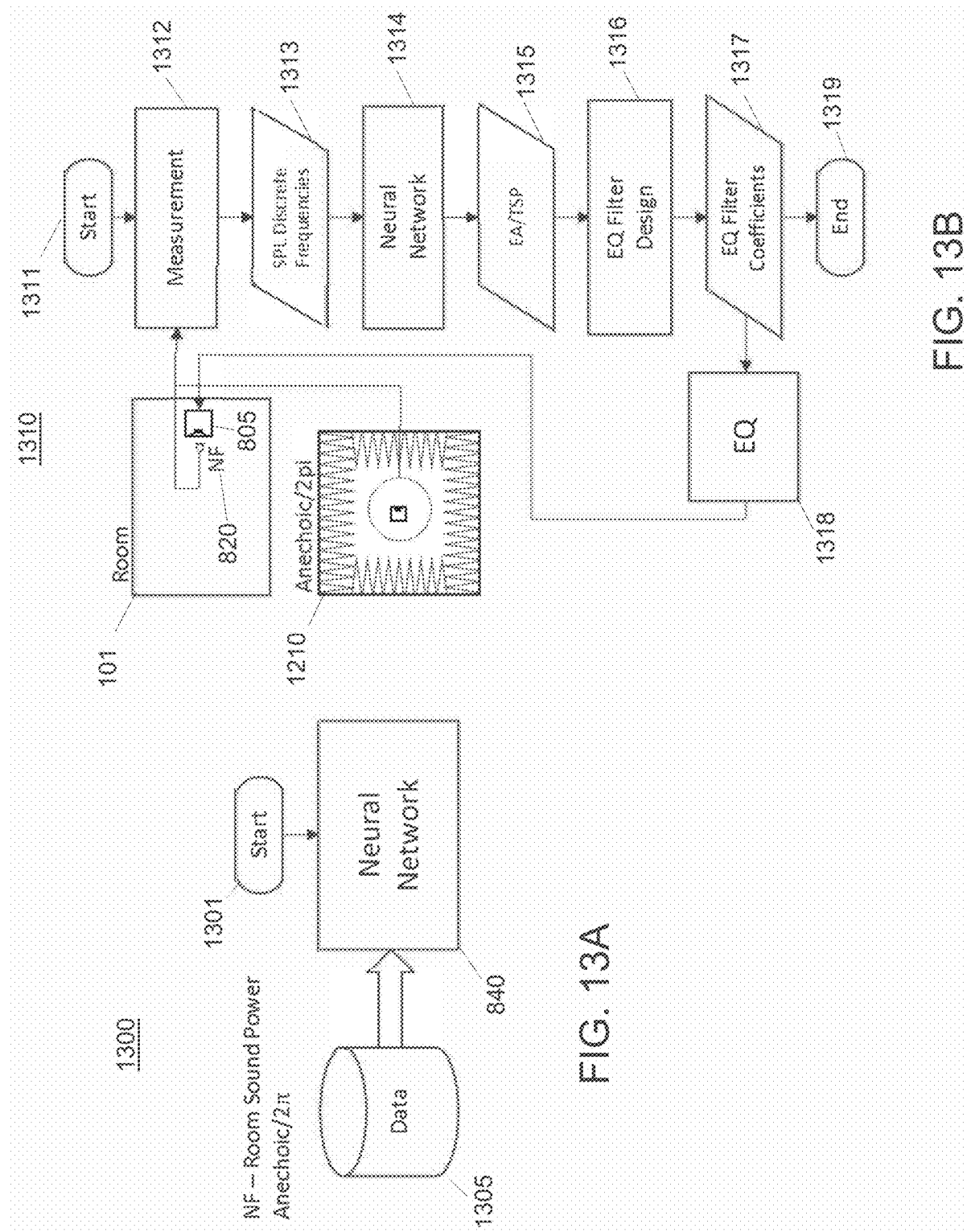

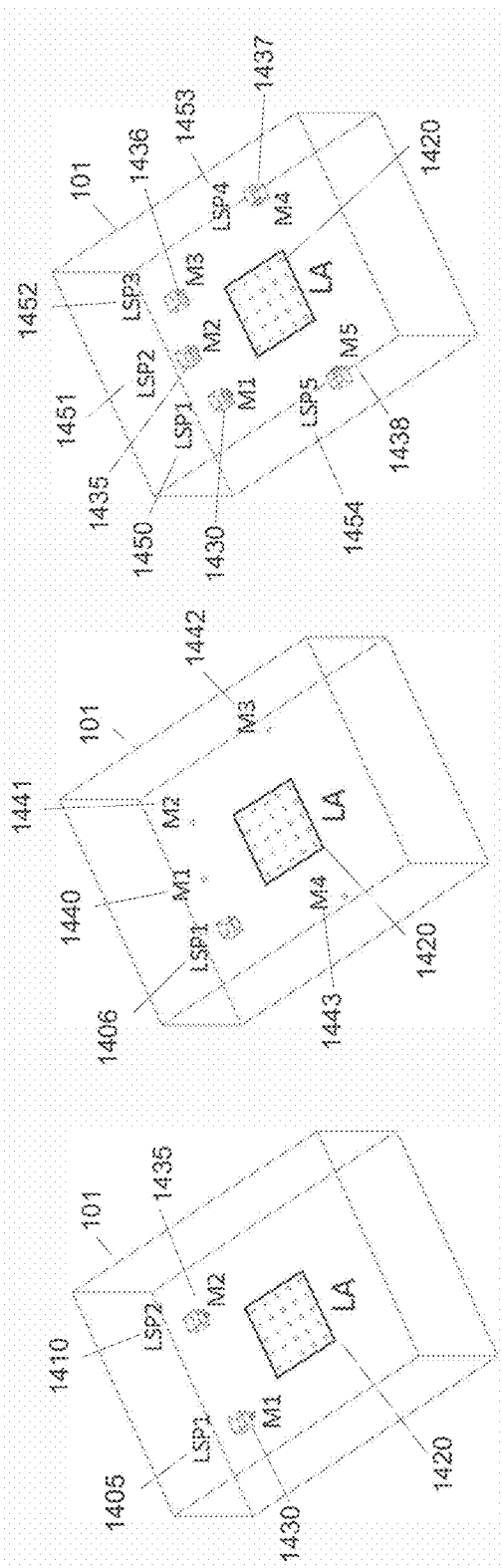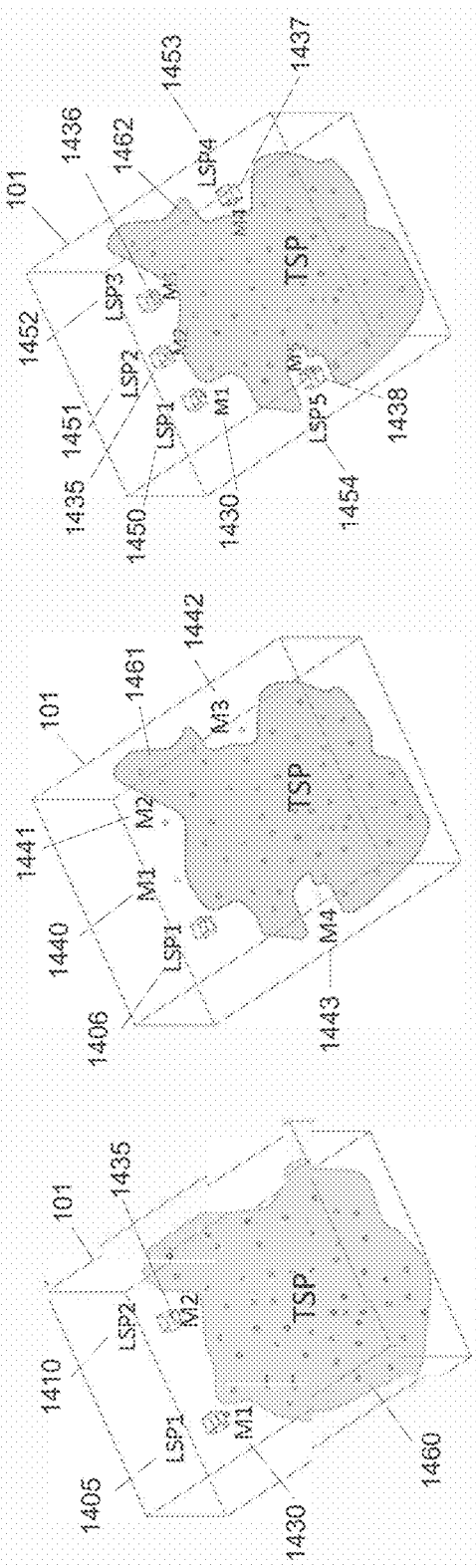

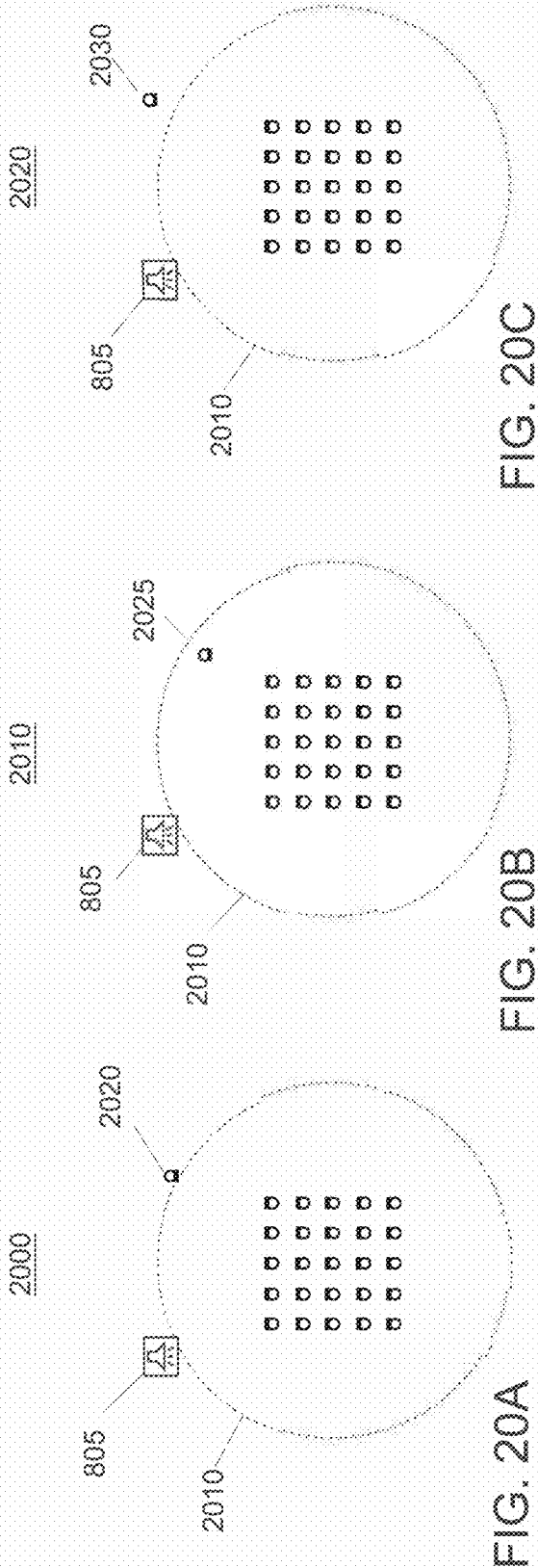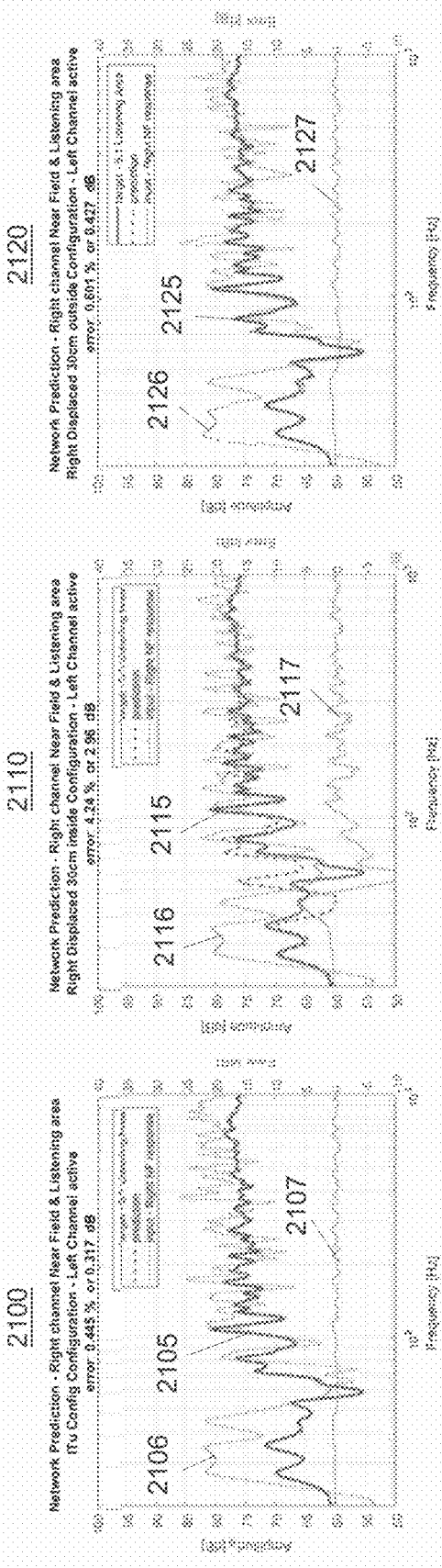

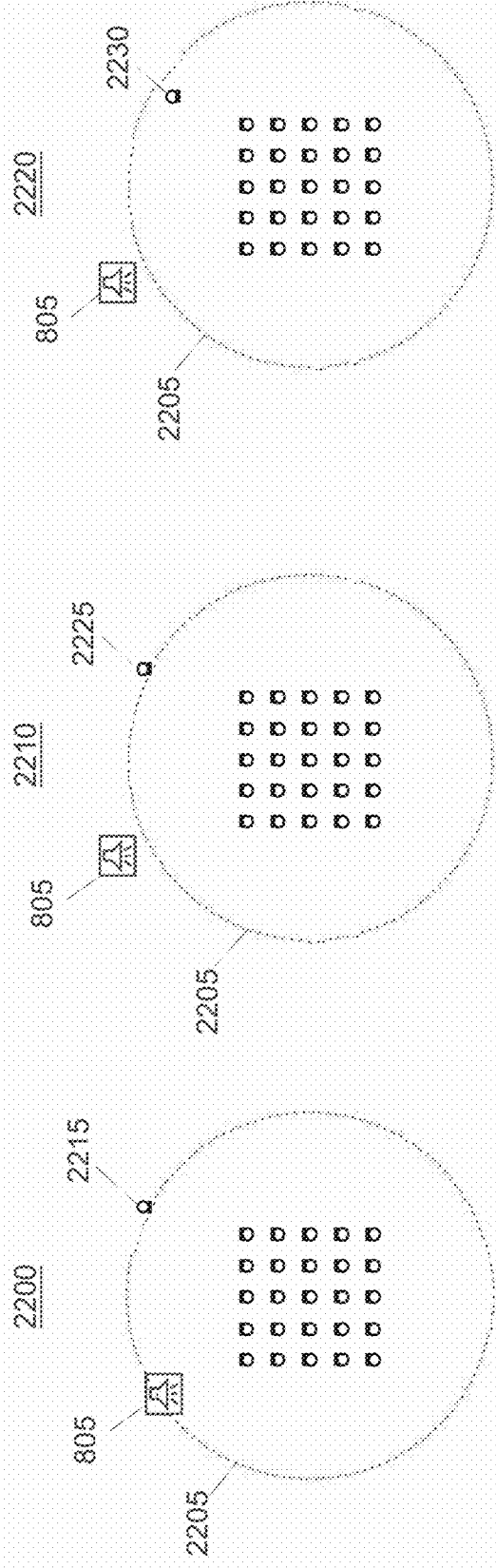
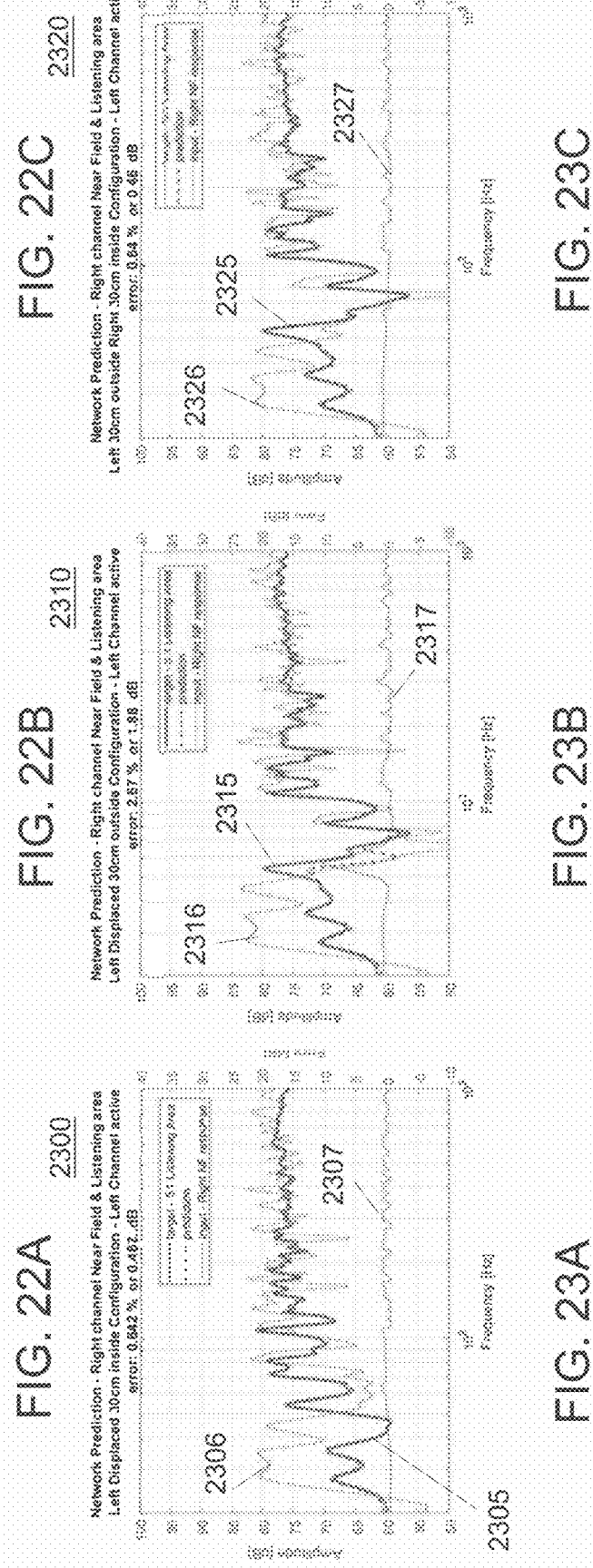
FIG. 22A  FIG. 22B  FIG. 22C
FIG. 23A  FIG. 23B  FIG. 23C

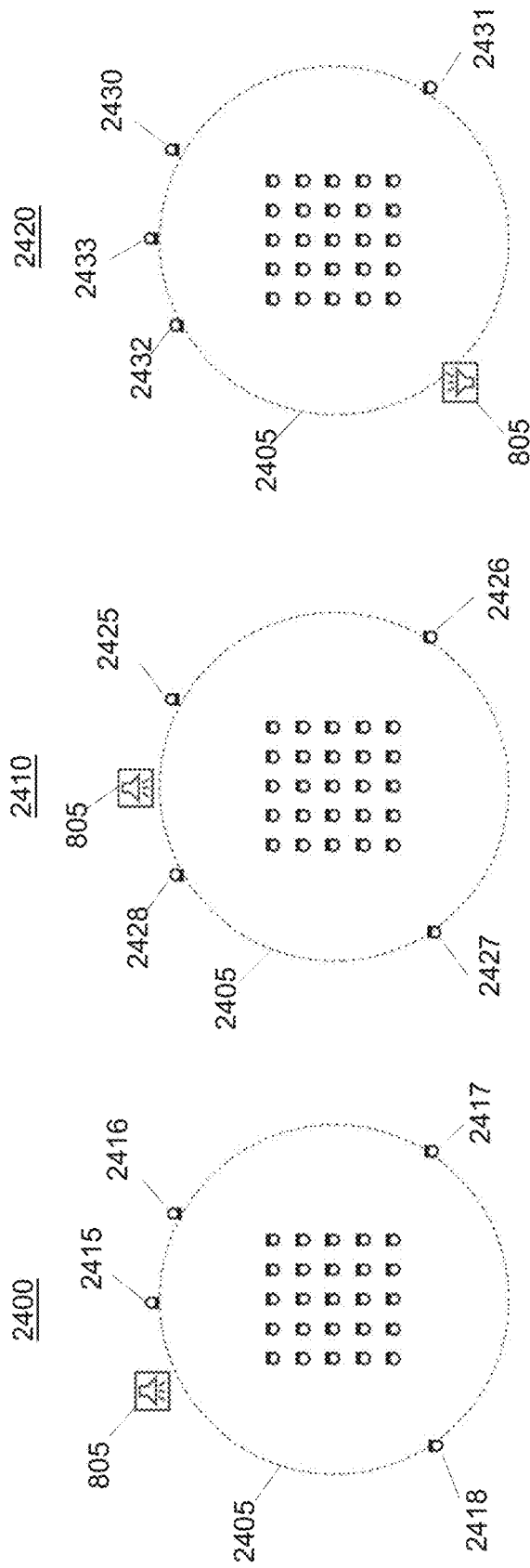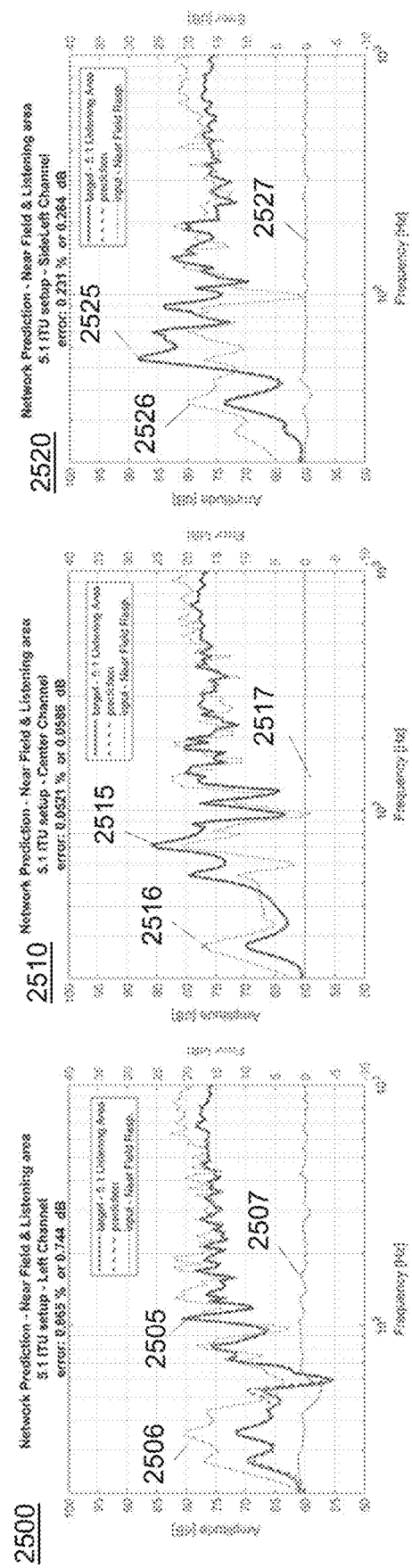
FIG. 24A  FIG. 24B  FIG. 24C
FIG. 25A  FIG. 25B  FIG. 25C

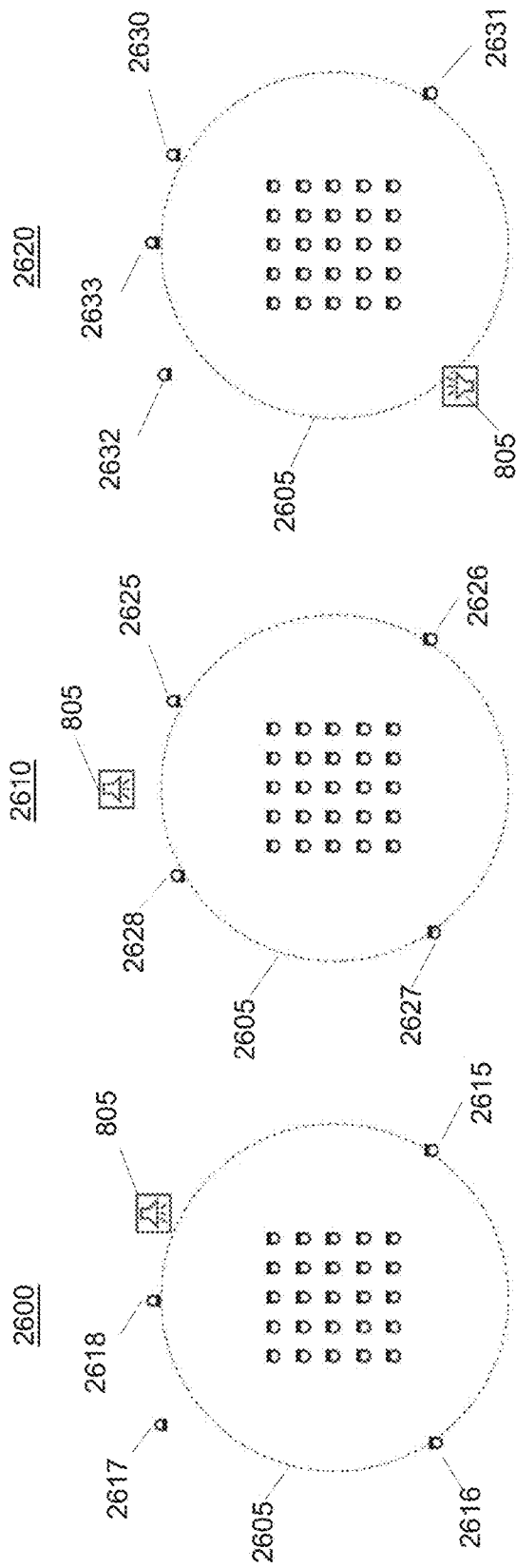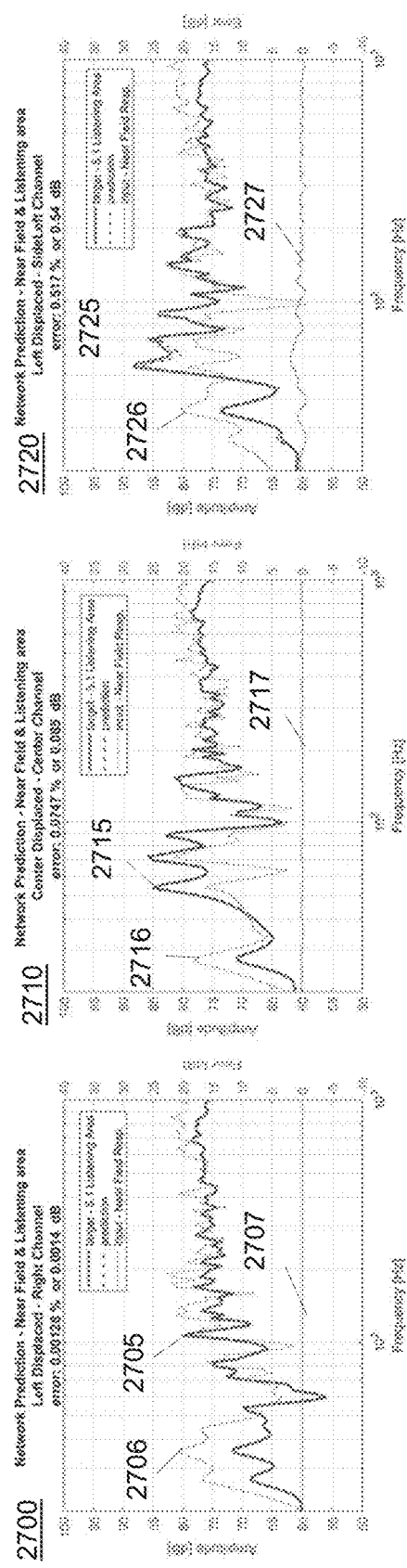

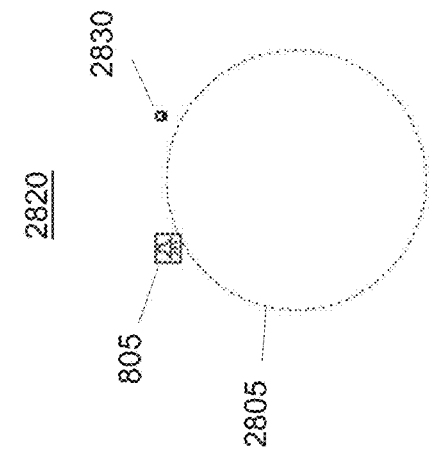
FIG. 28A
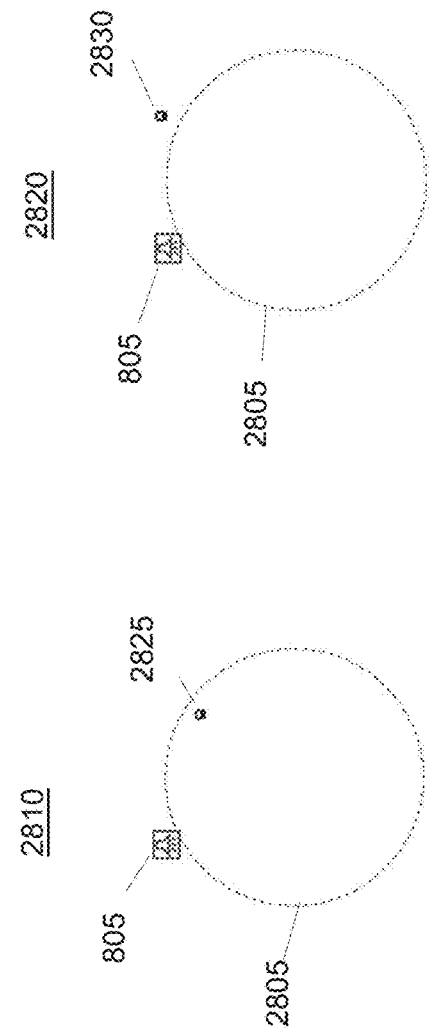
FIG. 28B
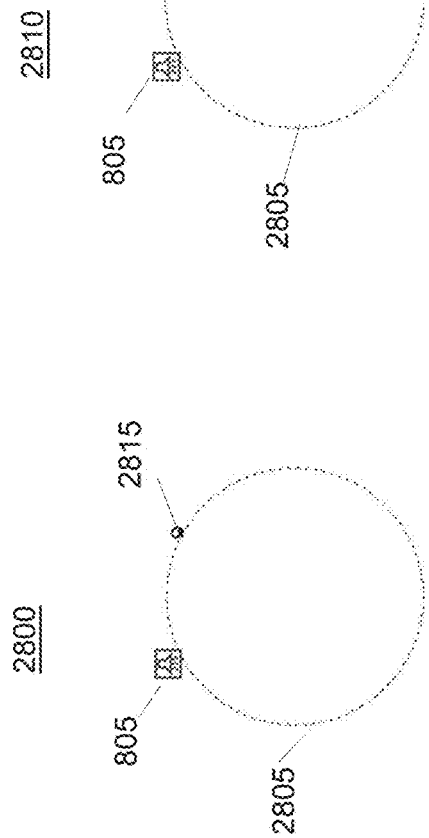
FIG. 28C
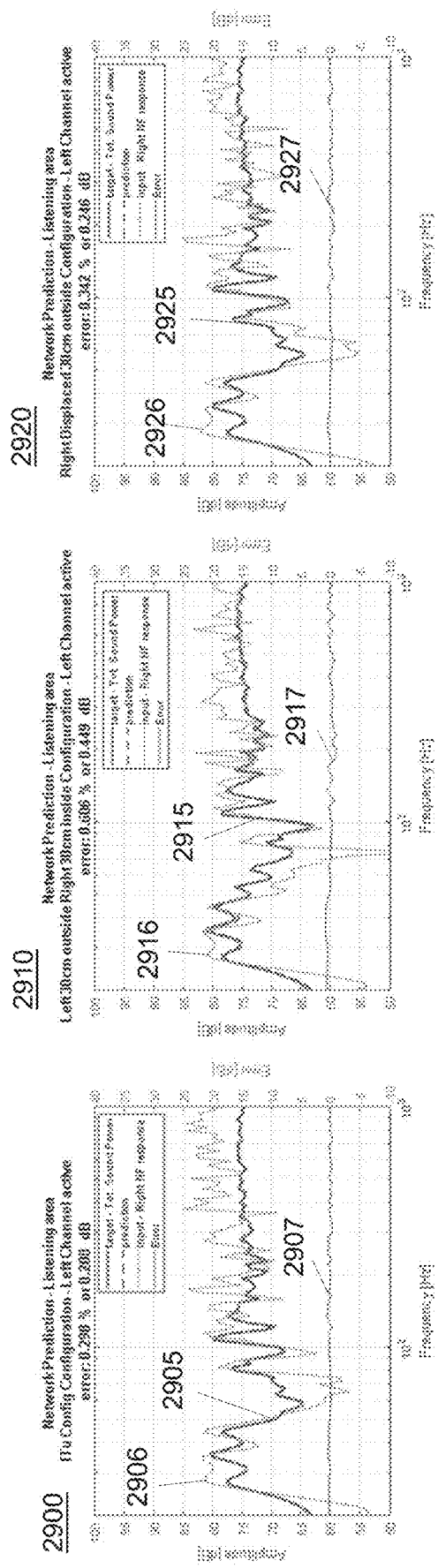
FIG. 29A
FIG. 29B
FIG. 29C

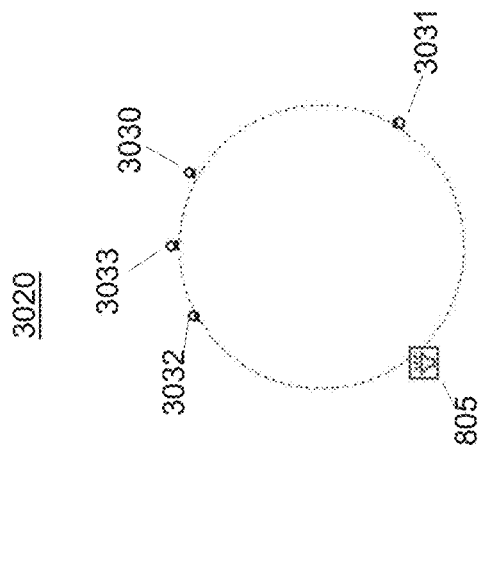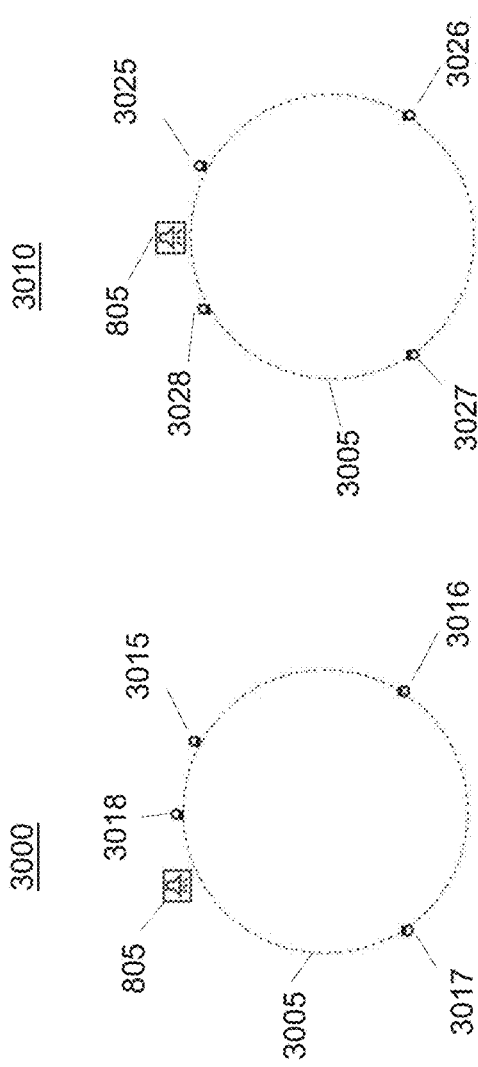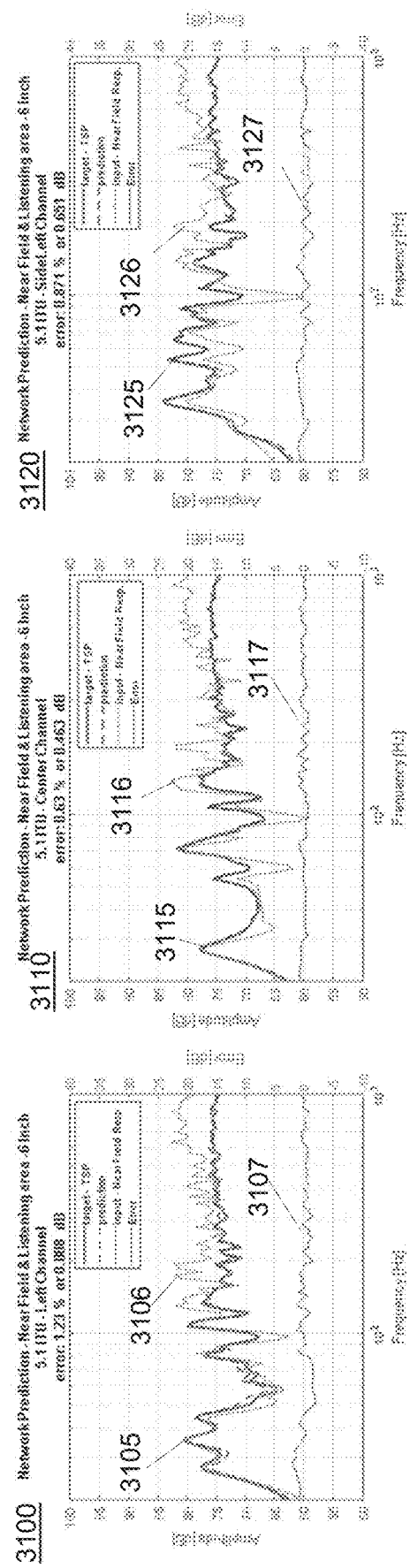
FIG. 30A  FIG. 30B  FIG. 30C
FIG. 31A  FIG. 31B  FIG. 31C

AUTOMATIC LOUDSPEAKER ROOM EQUALIZATION BASED ON SOUND FIELD ESTIMATION WITH ARTIFICIAL INTELLIGENCE MODELS

COPYRIGHT DISCLAIMER

A portion of the disclosure of this patent document may contain material that is subject to copyright protection. The copyright owner has no objection to the facsimile reproduction by anyone of the patent document or the patent disclosure as it appears in the patent and trademark office patent file or records, but otherwise reserves all copyright rights whatsoever.

TECHNICAL FIELD

One or more embodiments relate generally to loudspeaker equalization, and in particular, to automatic loudspeaker room equalization based on sound field estimation using artificial intelligence models such as neural networks.

BACKGROUND

When a loudspeaker radiates sound in a room, its response gets severely altered. The frequency response can show peaks and valleys up to 20 dB, especially in the frequency range where the wavelengths are comparable with the room dimensions (from 20 Hz to 400 Hz). This frequency response is due to the interaction of sound waves with the boundaries of the room, building distinguished zones with high sound pressure level (SPL), related to the room resonances, and zones with low SPL related to zones where the sound is self-cancelling. The effect in the sound is boominess related to the excessive low frequency energy that causes exaggerated sustain at some frequencies in the room.

In order to equalize the response of the loudspeaker in the room for a restricted listening area (LA) it is required to obtain the energy average (EA) in dB over the desired area, or if one desires to equalize the entire room, the total sound power (TSP) has to be obtained. This is normally measured with a number of microphones spaced over the LA or a large number of microphones randomly spaced in the room to acquire the TSP, also known as spatial average.

SUMMARY

One or more embodiments provide a computer-implemented method that includes acquiring, via at least one microphone, sound pressure data at one or more discrete frequencies obtained from a frequency response of a loudspeaker in a room. The sound pressure data is input into an artificial intelligence (AI) model that analyses and processes information, and that incorporates a relationship between the frequency response and at least one of an energy average (EA) in a listening area or a total sound power (TSP) produced by the loudspeaker. The AI model automatically estimates, without user interaction, the at least one of the EA in the listening area or the TSP produced by the loudspeaker.

Some embodiments provide a loudspeaker system that includes a loudspeaker connected with an equalization filter. At least one microphone is configured to acquire sound pressure data at one or more discrete frequencies obtained from a frequency response of the loudspeaker in a room. An AI model is connected with the at least one microphone. The sound pressure data is input into the AI model. The AI model incorporates a relationship between the frequency response and at least one of an EA in a listening area or a TSP produced by the loudspeaker.

One or more embodiments provide a loudspeaker system that includes multiple loudspeakers. The system further includes multiple equalization filters. Each equalization filter is connected to a particular one of the multiple loudspeakers. The system additionally includes multiple microphones. Each of the multiple microphones being configured to acquire sound pressure data at one or more discrete frequencies obtained from a frequency response of the particular one loudspeaker of the multiple loudspeakers in a room. An AI model is connected with each of the multiple microphones. The sound pressure data is input into the AI model. The AI model incorporates a relationship between the frequency response and at least one of an EA in a listening area or a TSP produced by each of the multiple of loudspeakers.

These and other features, aspects and advantages of the one or more embodiments will become understood with reference to the following description, appended claims and accompanying figures.

BRIEF DESCRIPTION OF THE DRAWINGS

FIG. 1 illustrates an example room with a first and second speaker position within the room and a plurality of microphones positioned randomly within the room for measuring sound pressure levels (SPLs);

FIGS. 2A-B illustrate frequency responses for the first and second speaker positions shown in FIG. 1;

FIG. 3 illustrates an example room with a first and second speaker position with a plurality of microphones distributed over the listening area for measuring SPLs;

FIGS. 4A-B illustrate frequency responses for the first and second speaker positions shown in FIG. 3;

FIG. 13A illustrates a flow diagram for NN training for the system of FIG. 12, according to some embodiments;

FIG. 13B illustrates a flow diagram for NN processing for the system of FIG. 12, according to some embodiments;

FIG. 14A illustrates an example setup of a room with a stereo setup including a first speaker system with a NF microphone and a second speaker system with an NF microphone and showing the LA, according to some embodiments;

FIG. 14B illustrates an example setup of a room with a first speaker system showing multiple microphone placements and showing the LA, according to some embodiments;

FIG. 14C illustrates an example setup of a room with multi-speaker systems each having a NF microphone and showing the LA, according to some embodiments;

FIG. 15A illustrates a room with a stereo setup including a first speaker system with an NF microphone and a second speaker system with an NF microphone, and showing the estimated TSP, according to some embodiments;

FIG. 15B illustrates a room with a first speaker system showing multiple microphone placements and showing the estimated TSP, according to some embodiments;

FIG. 15C illustrates a room with a multi-speaker system each having a NF microphone and showing the estimated TSP, according to some embodiments;

FIGS. 20A-C illustrate a speaker system placed at a single position with a microphone placed at multiple positions with respect to the LA, according to some embodiments;

FIGS. 21A-C illustrate graphs of NN predictions for the respective configurations in FIGS. 20A-C, according to some embodiments;

FIGS. 22A-C illustrate a speaker system placed at multiple positions with a microphone placed at multiple positions with respect to the LA, according to some embodiments;

FIGS. 23A-C illustrate graphs of NN predictions for the respective configurations in FIGS. 22A-C, according to some embodiments;

FIGS. 24A-C illustrate a speaker system placed at multiple positions with multiple microphones placed at multiple positions with respect to the LA, according to some embodiments;

FIGS. 25A-C illustrate graphs of NN predictions for the respective configurations in FIGS. 24A-C, according to some embodiments;

FIGS. 26A-C illustrate a speaker system placed at multiple positions with multiple microphones placed at multiple positions with respect to the LA, according to some embodiments;

FIGS. 27A-C illustrate graphs of NN predictions for the respective configurations in FIG. 246-C, according to some embodiments;

FIGS. 28A-C illustrate a speaker system placed at a single position with a microphone placed at multiple positions with respect to a TSP, according to some embodiments;

FIGS. 29A-C illustrate graphs of NN predictions for the respective configurations in FIGS. 28A-C, according to some embodiments;

FIGS. 30A-C illustrate a speaker system placed at multiple positions with multiple microphones placed at multiple positions with respect to a TSP, according to some embodiments; and FIGS. 31A-C illustrate graphs of NN predictions for the respective configurations in FIGS. 30A-C, according to some embodiments.

DETAILED DESCRIPTION

Figure 5A:
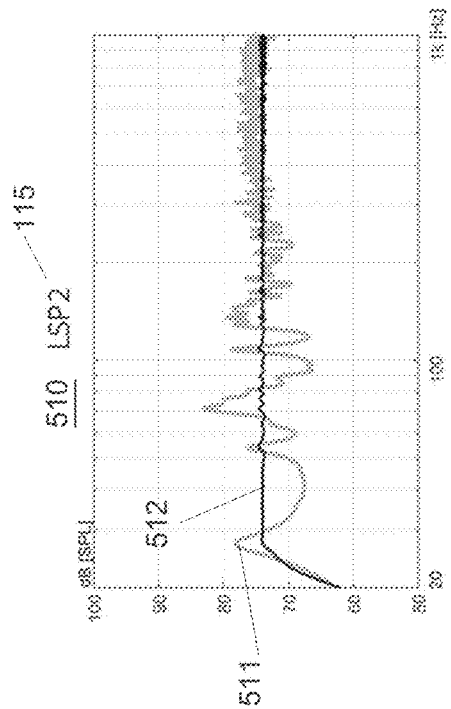
FIG. 5A illustrates a graph of total sound power (TSP) and TSP plus equalization for the first speaker position in FIG. 1.

The following description is made for the purpose of illustrating the general principles of one or more embodiments and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

One or more embodiments relate generally to loudspeaker equalization, and in particular, to automatic loudspeaker room equalization based on sound field estimation using one or more artificial intelligence (AI) models (e.g., one or more neural networks (NNs)). One or more embodiments provide a computer-implemented method that includes acquiring, via at least one microphone, sound pressure data at one or more discrete frequencies obtained from a frequency response of a loudspeaker in a room. The sound pressure data is input into an AI model that analyses and processes information, and that incorporates a relationship between the frequency response and at least one of an energy average (EA) in a listening area or a total sound power (TSP) produced by the loudspeaker. The AI model automatically estimates, without user interaction, the at least one of the EA in the listening area or the TSP produced by the loudspeaker.

Some embodiments provide a loudspeaker system that includes a loudspeaker connected with an equalization filter. At least one microphone is configured to acquire sound pressure data at one or more discrete frequencies obtained from a frequency response of the loudspeaker in a room. An AI model is connected with the at least one microphone. The sound pressure data is input into the AI model. The AI model incorporates a relationship between the frequency response and at least one of an EA in a listening area or a TSP produced by the loudspeaker.

One or more embodiments provide a loudspeaker system that includes multiple loudspeakers. The system further includes multiple equalization filters. Each equalization filter is connected to a particular one of the multiple loudspeakers. The system additionally includes multiple microphones. Each of the multiple microphones being configured to acquire sound pressure data at one or more discrete frequencies obtained from a frequency response of the particular one loudspeaker of the multiple loudspeakers in a room. An AI model is connected with each of the multiple microphones. The sound pressure data is input into the AI model. The AI model incorporates a relationship between the frequency response and at least one of an EA in a listening area or a TSP produced by each of the multiple of loudspeakers.

For expository purposes, the terms "speaker," "loudspeaker," "loudspeaker device," and "loudspeaker system" may be used interchangeably in this specification.

FIG. 1 illustrates examples 100 and 110 of a room 101 with a first speaker position (LSP1) 105 and a second speaker position (LSP2) 115 within the room 101 and a plurality of microphones 120 (e.g., 49 microphones) positioned randomly within the room 101 (having dimensions Lx (width), Ly (length) and Lz (height) for measuring SPLs for a loudspeaker that receives sound from a source (e.g., a television (TV), an audio system (e.g., an audio receiver, an amplifier that receives an audio signal from an electronic device (e.g., a smartphone, a computing pad, etc.), etc.). To obtain the total sound power (TSP) or the average SPL produced by the loudspeaker in the room (e.g., at LSP1 105 or LSP2 115), the SPL at discrete frequencies is normally measured by using measurements from a large number of microphone positions (e.g., microphones 120) randomly spaced in the room 101. This is a tedious task which is not desirable to be done by the user.

FIGS. 2A-B illustrate examples 200 and 210 of frequency responses for the first speaker position (LSP1) 105 and the second speaker position (LSP2) 115 (within the room 101 and a plurality of microphones 120) shown in FIG. 1. In the example 200 for LSP1 105, the frequency response is graphed for TSP 202 and for the frequency response 201 for measurements from the microphones 120 for comparison. In the example 210 for LSP2 115, the frequency response is graphed for TSP 212 and for the frequency response 211 for measurements from the microphones 120 for comparison.

FIG. 3 illustrates examples 300 and 310 for an example room 101 with the first speaker position LSP1 105 and the second speaker position LSP2 115 with a plurality of microphones 320 distributed over the listening area for measuring SPLs. Automatic loudspeaker energy average (EA) estimation along the LA without the interaction of the user is conducted as follows. To obtain the EA in dBs produced by the loudspeaker in the LA in the room 101, the SPL at discrete frequencies is normally measured at a large number of microphone positions distributed in the typical LA of the room 101. This is a tedious task which is not desirable to be done by the user. For example, a single microphone needs to be placed at a first position in the LA with multiple sounds produced by a source and measured by the microphone. This must be repeated for each microphone position in the LA. Some problems that may occur are extraneous sound occurring during microphone measurement (e.g., from room 101 and external environment noise, etc.). This may result in a degraded measurement, which would need to be repeated. The loudspeaker may move to another position, which would require new measurements for each position.

FIGS. 4A-B illustrate examples 400 and 410 of frequency responses for the first speaker position (LSP1) 105 and the second speaker position (LSP2) 115 (within the room 101) and a plurality of LA microphones 320 in a LA shown in FIG. 3. In the example 400 for LSP1 105, the frequency response is graphed for LA EA 401 and for the frequency response 402 for measurements from the LA microphones 320 for comparison. In the example 410 for LSP2 115, the frequency response is graphed for LA EA 411 and for the frequency response 412 for measurements from the LA microphones 320 for comparison.

Figure 5B:
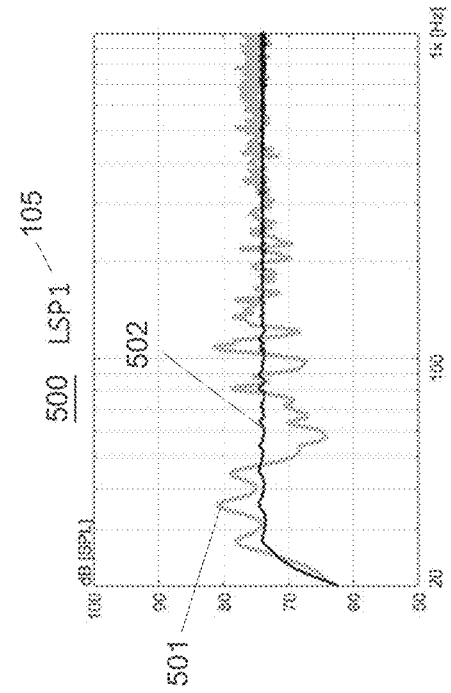
FIG. 5B illustrates a graph of TSP and TSP plus equalization for the second speaker position in FIG. 1.

FIG. 5A illustrates a graph 500 of TSP 501 and TSP plus equalization (EQ) 502 for the first speaker position LSP1 105 in FIG. 1. FIG. 5B illustrates a graph 510 of TSP 511 and TSP plus EQ 512 for the second speaker position LSP2 115 in FIG. 1. One problem to be solved is to correct the destructive impact of the frequency response throughout the room (e.g., room 101, FIGS. 1 and 3). In some embodiments, once the TSP is obtained at discrete frequencies, an electric EQ filter (e.g., EQ filter 810, FIGS. 8, 10, 12 and 16) may be applied in front of the loudspeaker (e.g., LSP(s) 805, FIGS. 8, 10, 12 and 16, LSP 1005, FIG. 10) to balance the response of the loudspeaker in the room.

Figure 6A:
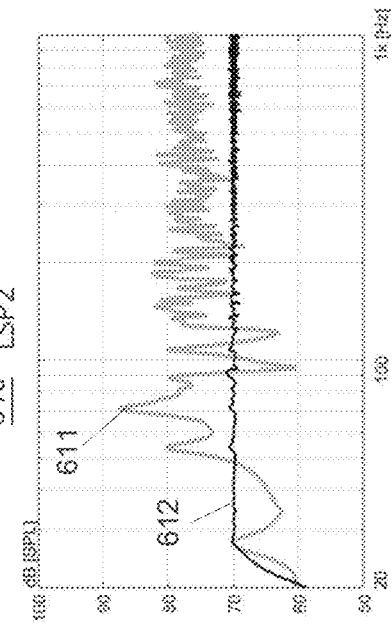
FIG. 6A illustrates a graph of energy average (EA) and EA plus equalization for the first speaker position in FIG. 3.
Figure 6B:
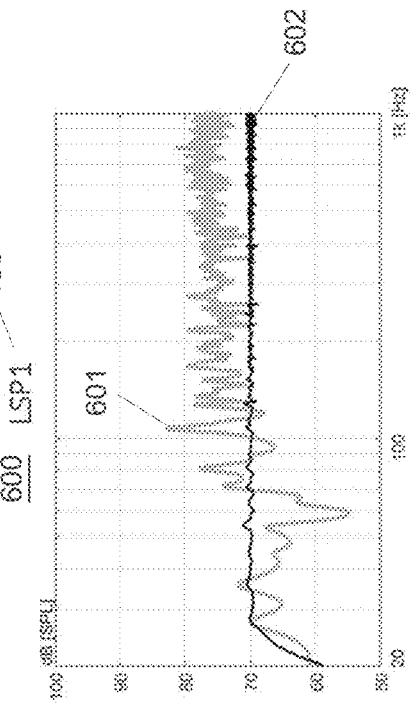
FIG. 6B illustrates a graph of EA and EA plus equalization for the second speaker position in FIG. 3.

FIG. 6A illustrates a graph 600 of EA 601 and EA plus EQ 602 for the first speaker position LSP1 105 in FIG. 3. FIG. 6B illustrates a graph 610 of EA 611 and EA plus EQ 612 for the second speaker position LSP2 115 in FIG. 3. Another problem to be solved is to correct the destructive impact of frequency response in the room (e.g., room 101, FIGS. 1 and 3) along the LA. Once the EA is obtained at discrete frequencies, an electric EQ filter (e.g., EQ filter 810, FIGS. 8, 10, 12 and 16) may be applied in front of the loudspeaker (e.g., LSP(s) 805, FIGS. 8, 10, 12 and 16, LSP 1005, FIG. 10) to balance the response of the loudspeaker along the LA in the room.

Figure 7B:
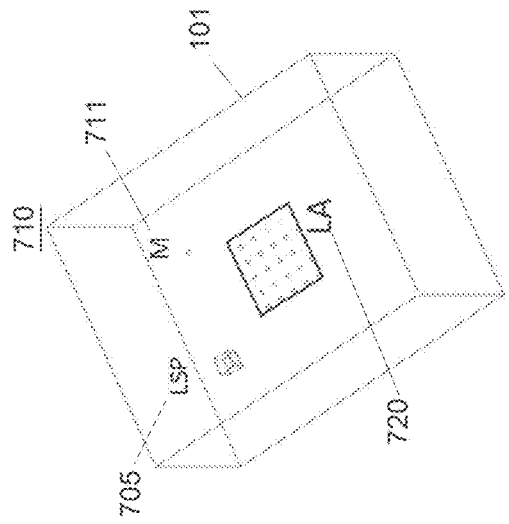
FIG. 7B illustrates an example room with a speaker, a microphone placed at a single position and EA processing utilizing an NN, for determining EA over a listening area (LA), according to some embodiments.
Figure 7A:
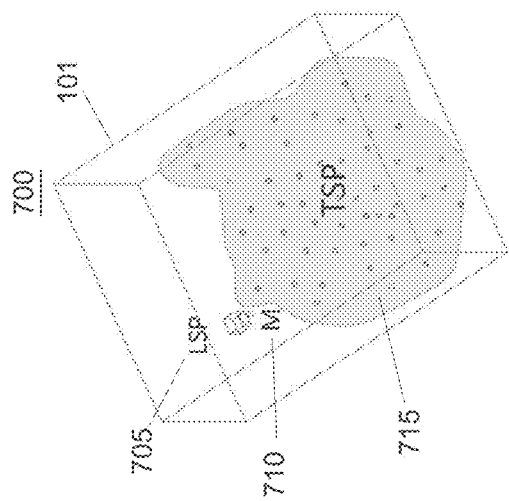
FIG. 7A illustrates an example room with a speaker including a microphone and TSP processing utilizing a neural network (NN), for determining TSP, according to some embodiments.

FIG. 7A illustrates an example 700 showing a room 101 with a speaker, LSP 705, including a microphone 710 and TSP processing (as described below) utilizing an NN (e.g., NN 840, FIG. 8), for determining TSP 715, according to some embodiments. In one or more embodiments, the TSP 715 produced by the LSP 705 in the room 101 is estimated by using trained NNs and automatically performing an estimation without user interaction. By using trained NNs, the TSP 715 in the room 101 is estimated with a low standard deviation error as compared with conventional techniques. During training, the NN is provided input (e.g., input 845, FIG. 8) to the NN of actual near field (NF) data (sound pressure at discrete frequencies obtained in the NF) of the LSP 705 by microphone 710 at position M attached to the LSP 705, and also the actual TSP/EA to learn the relationship between the NF response and the actual TSP 715. It should be noted that the NN may be replaced with another type of AI or machine learning (ML) model that accomplishes a similar purpose or function.

In some embodiments, the NN may be trained using data measured in a number of rooms, for example: a room including a number of loudspeaker positions and one or more measurements on each speaker position including the NF SPL, measuring the TSP 715 with a large number of microphones or a moving microphone technique (e.g., moving a single microphone to a plurality of positions for taking measurements). Once the TSP 715 has been estimated by the trained NN, an EQ filter (e.g., EQ filter 810, FIG. 8) may be applied to compensate the response towards a desired target response.

FIG. 7B illustrates an example 710 of the room 101 with a speaker, LSP 705, a microphone 711 placed at a single position and EA processing (as described below) utilizing one or more NNs (e.g., NN 840, FIG. 8), for determining EA over the LA 720, according to some embodiments. In some embodiments, the EA in the LA 720 or the TSP produced by the LSP 705 is estimated using NNs, where the estimation may be performed automatically with the use of at least one microphone 711 at position M outside the LA. The EA in the LA 720 of the room 101 may be estimated with a low standard deviation error compared with conventional techniques.

In some embodiments, the one or more NNs uses the TSP at discrete frequencies for input, where the discrete frequencies are obtained by at least one or more microphones surrounded within the LA 720 to learn the relationship between these responses and specific sound field areas in the room 101. The one or more NNs may be trained using data measured in a number of rooms, for example: cases that include a number of possible loudspeaker positions; a few microphones surrounded within the LA 720; for each case, a measurement on a large number of microphones distributed along the LA 720 or using a moving microphone technique to compute the EA over the LA 720. Once the EA has been estimated by a trained NN, an EQ filter (e.g., EQ filter 810, FIGS. 8, 10, 12 and 16) may be applied to compensate the response towards a desired target response.

Figure 8:
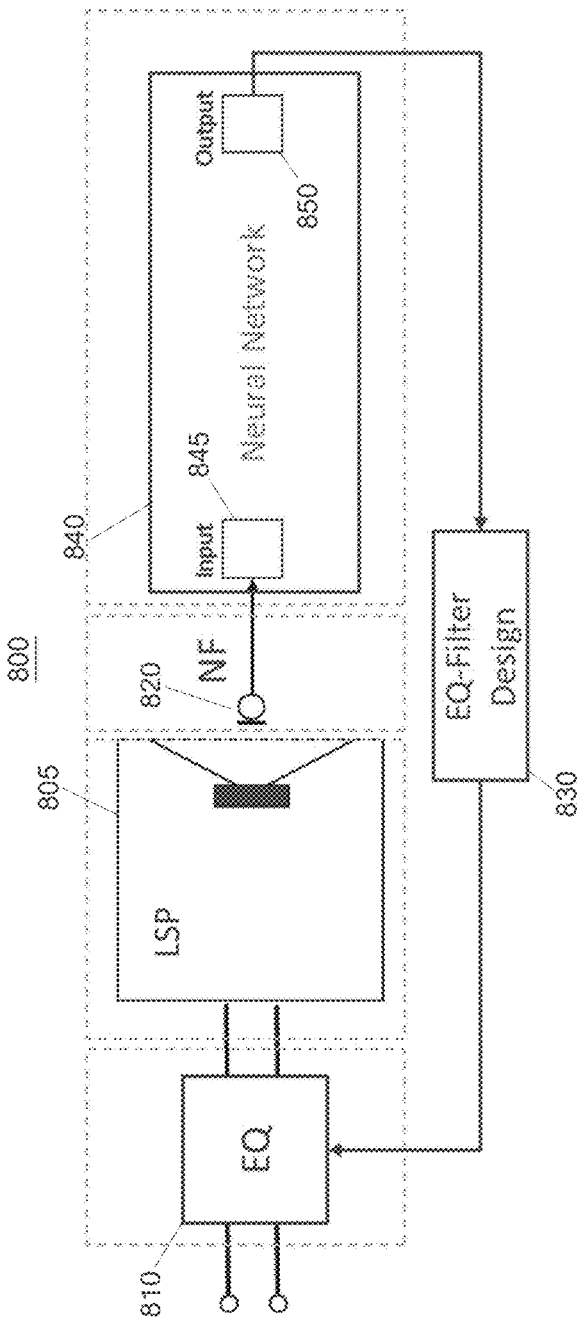
FIG. 8 illustrates a block diagram for speaker system including a near field (NF) microphone, a NN, an equalization filter (EQ-filter) design and equalization filter (EQ), according to some embodiments.

FIG. 8 illustrates a block diagram for speaker (LSP 805) system 800 including an NF microphone 820, a NN 840, an EQ-filter design 830 and filter EQ 810, according to some embodiments. In one or more embodiments, the filter EQ 810 compensates a frequency response towards a desired target frequency response. The LSP 805 may be any loudspeaker including, for example, a full range speaker, a subwoofer loudspeaker, a sound bar, a TV including speakers, etc. The filter EQ 810 includes filters that influence the volume of specified frequencies or a range of frequencies within the audio spectrum. The filter EQ 810 may attenuate, boost, remove, or leave these frequencies unchanged. The EQ-filter design 830 includes using a filter designer, such as an infinite impulse response (IIR) filter or finite impulse response (FIR) filter to adjust the magnitude and phase of a the LSP 805. The NF microphone 820 may be any microphone used to record the SPL at discrete frequencies. In some embodiments, the NF microphone 820 is positioned as close as possible to the driver of the LSP 805. The NN 840 has NF frequency responses as the input 845, and predict the TSP in the room or EA in an LA at discrete frequencies is the output 850.

In some embodiments, system 800 may automatically perform the estimation of the sound field in a room with the use of one NF microphone 820 at the near field of the LSP 805 or positioned outside the LA. In one or more embodiments, in a stereo speaker system setup for example, a left loudspeaker may include a microphone that may be used to estimate the sound field of the right speaker at the LA or in the whole room. In some embodiments, increasing the number of microphones attached to loudspeakers increases the performance of the sound field estimation. By using one or more embodiments, a user benefits by having an improved sound quality from a loudspeaker, especially at low frequencies. In some embodiments, the boominess related to the excessive low frequency sound energy that causes exaggerated sustainment at some frequencies in the room is removed. Other benefits of one or more embodiments include better intelligibility for speech in a TV program, higher clarity in music reproduction, etc. In some embodiments, when the loudspeaker is set for the first time in the room, an automatic routine may be started to obtain the NF measurement and obtain the coefficients for the EQ 810 that corrects the influence of the room. In one or more embodiments, a loudspeaker, such as a subwoofer, the system 800 may indicate (e.g., providing a tone or sound, providing a synthetic voice message, etc.) that the current position is not optimal and may indicate a better position in the room. In some embodiments, system 800 improves the sound quality for one or more speakers in a TV as the influence of the nearby boundaries, such as a table, a back wall, etc., may otherwise reduce the sound quality.

Figure 9:
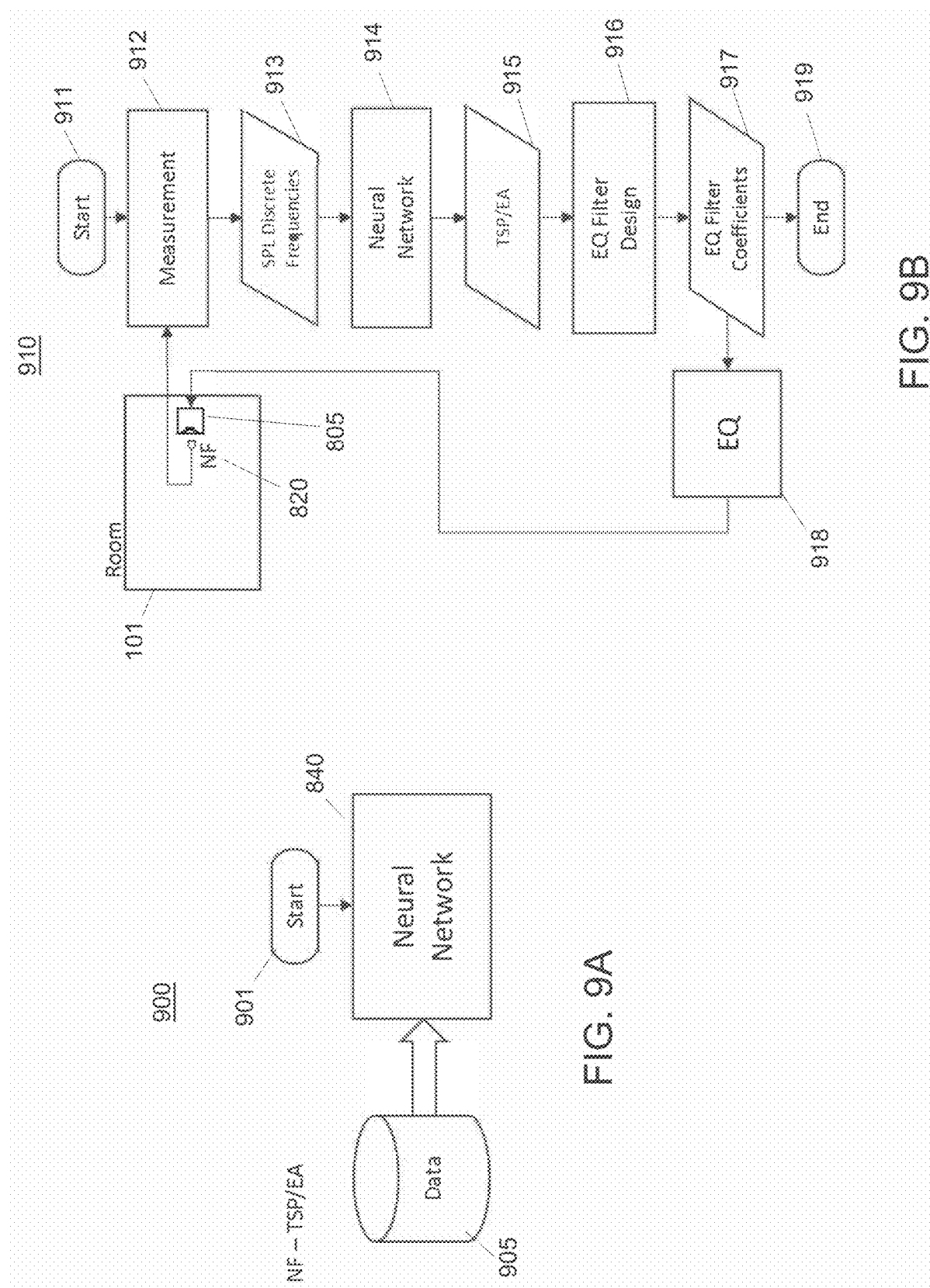
FIG. 9A illustrates a flow diagram for NN training for the system of FIG. 8, according to some embodiments.
FIG. 9B illustrates a flow diagram for NN processing for the system of FIG. 8, according to some embodiments.

FIG. 9A illustrates a flow diagram 900 for NN 840 training for the system of FIG. 8, according to some embodiments. For the training of the NN 840, the data 905 (e.g., stored in a memory, etc.) includes the NF measurement frequency response (which is the input 845 (FIG. 8) for the NN 840) and the TSP in the room or EA in an LA at discrete frequencies (which is the output 850 (FIG. 8) of the NN 840 (depending on the implementation, selection, etc.). The training of the NN 840 starts at block 901 where the data 905 is input to the NN 840. The NN 840 processes the input and proceeds to block 911 of FIG. 9B.

FIG. 9B illustrates a flow diagram 910 for NN 840 processing for the system 800 of FIG. 8, according to some embodiments. In some embodiments, the training data 905 for the NN 840 is used for an entire room equalization. The flow diagram 910 proceeds to block 912 where a LSP 805 may be measured in one or more rooms 101 to provide measurements. In the one or more rooms 101, the LSP 805 with the NF microphone 820 may be used for taking measurements at four (4) to six (6) typical positions. In some embodiments, when the NN 840 processing outputs the estimated TSP or estimated EA in block 915, the SPL discrete frequency measurements are performed at the NF microphone 820 attached to the LSP 805 and at a number of microphones randomly distributed within the room 101 from which the actual TSP may be computed in block 913 using the following equation:

$$TSP = \sqrt{\frac{1}{n}\sum_{i=1}^{n} P_i^2},$$

where n is the number of microphones in the room 101 (excluding the NF microphone 820), P is the SPL in decibels (dBs) at discrete frequencies. In one or more embodiments, the actual room TSP may be obtained by using a moving microphone technique. In block 914, the NN 840 is provided the input of the NF measurement frequency response. The estimated TSP is the target output of the NN 840 in block 915, which represents the actual room response for training.

In some embodiments, when the NN 840 processing provides outputs of estimated EA in block 915, the training data 905 used is the LA 720 (FIG. 7B) equalization. The measurements from block 912 may be performed by at least one microphone 711 (FIG. 8) at position M outside the LA 720 and at a number of microphones distributed within the LA 720 in the room 101 resulting in the SPL discrete frequencies in block 913, from which the estimated EA may be determined by the NN 840 for output to block 915 using the following equation:

$$EA = \sqrt{\frac{1}{n}\sum_{i=1}^{n} P_i^2},$$

where n is the number of microphones in the LA 720 of the room 101, and P is the SPL in dB at discrete frequencies. In one or more embodiments, in block 915, the target EA may be obtained by using the moving microphone technique. The microphone 711 outside the LA 720 measurement of frequency response is the input 845 (FIG. 8) for the NN 840.

The estimated EA in block 915 is the target output of the NN 840, which represents the LA room response for training purposes.

In some embodiments, in block 916 the EQ-filter design 830 (FIG. 8) adjusts the magnitude and phase of the LSP 805. In block 917, the output from block 916 is used to determine coefficients for the EQ 810 (FIG. 8) in block 918, where the EQ 810 then balances the response of the LSP 805 in the room 101. In some embodiments, upon successful completion of an automatic processing cycle (e.g., meeting a predefined result tolerance, upon completion of a predetermined time, completing a predefined number of cycles, etc.), the processing cycle ends in block 919.

Figure 10:
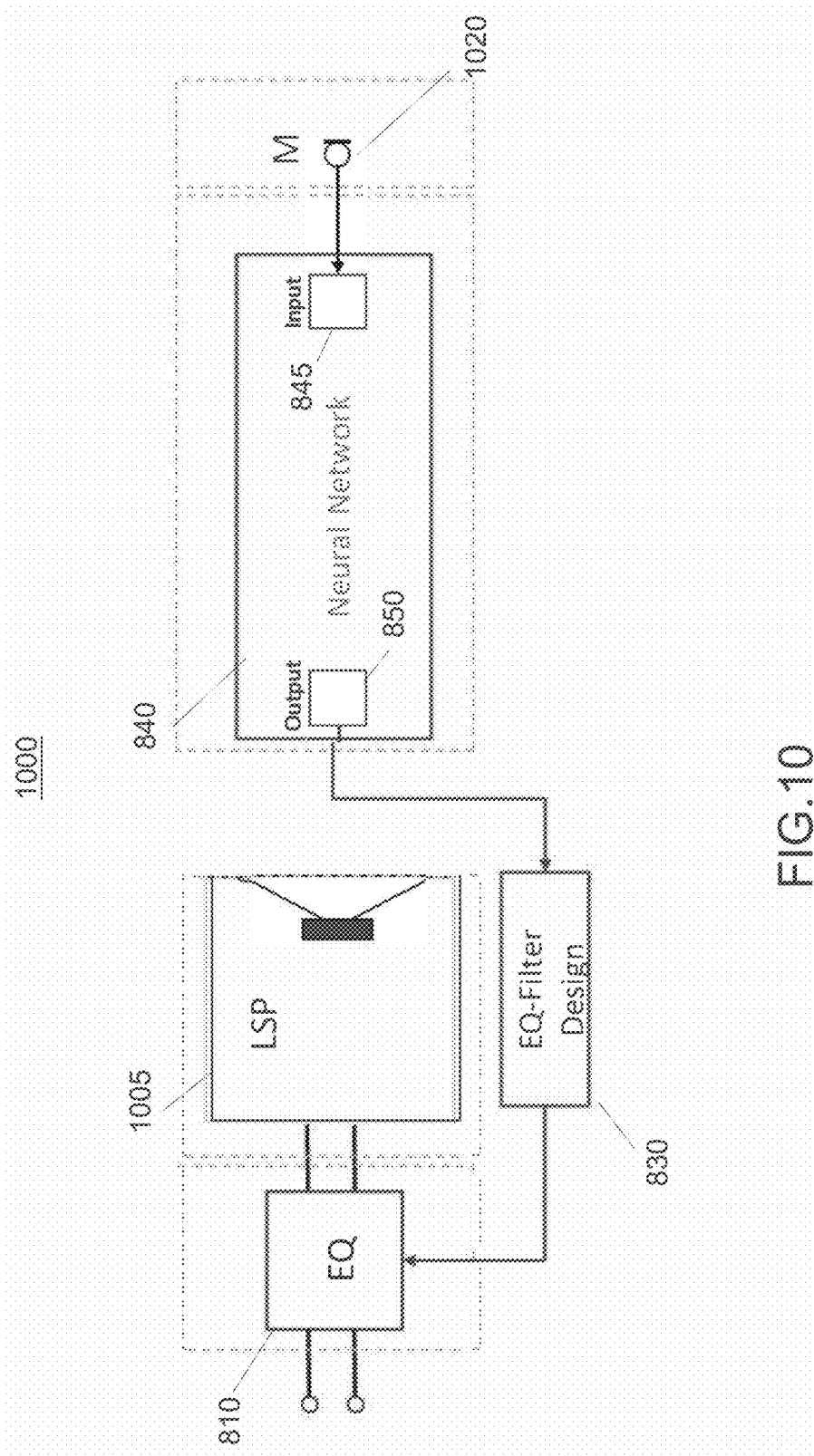
FIG. 10 illustrates a block diagram for another speaker system including a microphone, a NN, an EQ-filter design and EQ, according to some embodiments.

FIG. 10 illustrates a block diagram for another speaker system 1000 including a microphone 1020, an NN 840, an EQ-filter design 830 and EQ 810, according to some embodiments. Distinguishable from the system 800 (FIG. 8), the frequency response at the microphone 1020 is the input 845 of the NN 840. The EA estimation in the LA at discrete frequencies is the output 850 of the NN 840. In one or more embodiments, the LSP 1005 is similar to the LSP 805 (FIG. 8) without the NF microphone 820 positioned in the NF of the LSP 1005.

Figure 11:
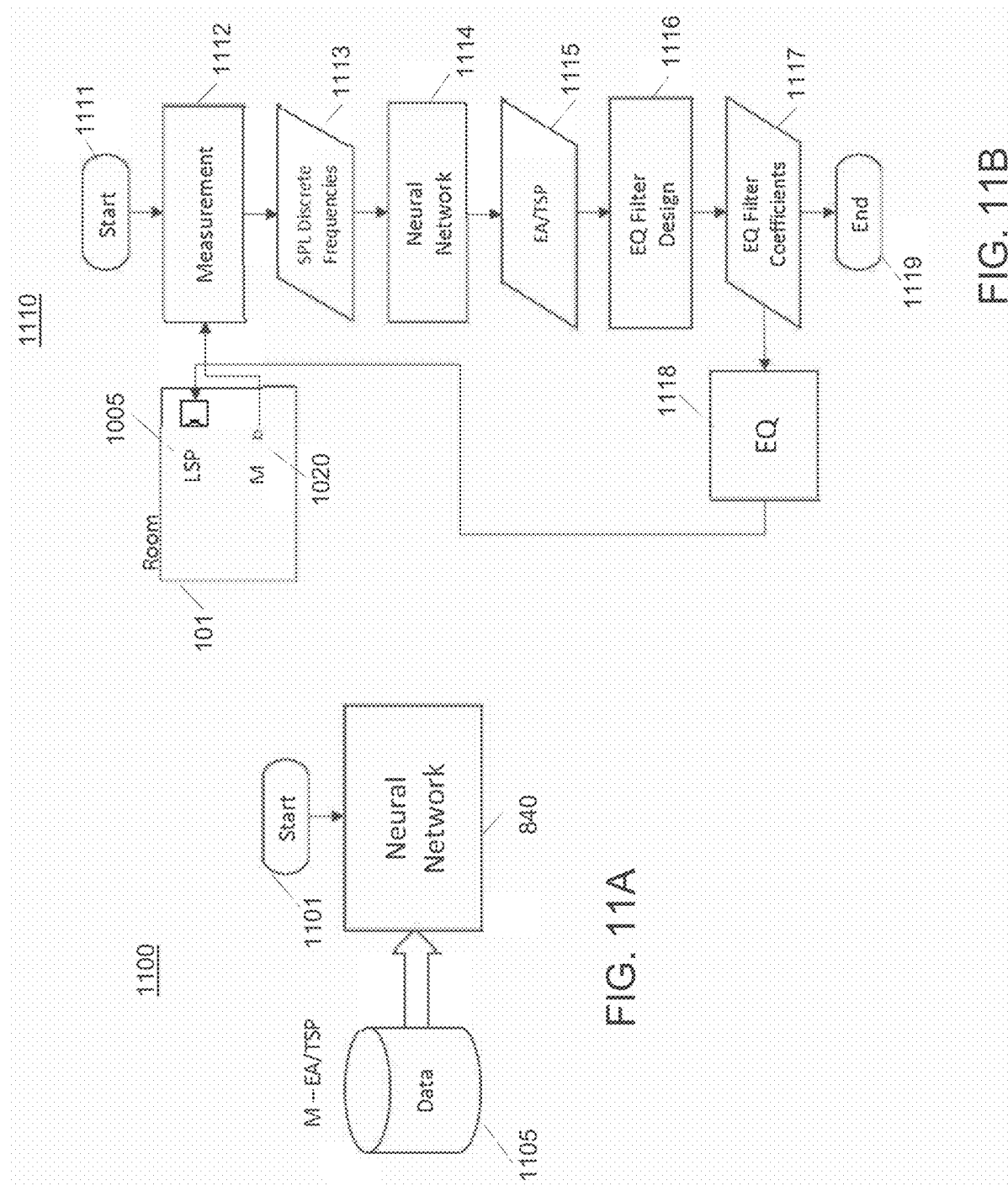
FIG. 11A illustrates a flow diagram for NN training for the system of FIG. 10, according to some embodiments.
FIG. 11B illustrates a flow diagram for NN processing for the system of FIG. 10, according to some embodiments.

FIG. 11A illustrates a flow diagram 1100 for NN 840 training for the system 1000 of FIG. 10, according to some embodiments. For the training of the NN 840, the data 1105 (e.g., stored in a memory, etc.) includes the measurement frequency response (which is the input 845 (FIG. 10) for the NN 840) and the TSP in the room 101 or the EA in an LA at discrete frequencies (which is the output 850 (FIG. 10) of the NN 840 (depending on the implementation, selection, etc.). The training of the NN 840 starts at block 1101 where the data 1105 is input to the NN 840. The NN 840 processes the input 845 and proceeds to block 1111 of FIG. 11B.

FIG. 11B illustrates a flow diagram 1110 for NN processing for the system 1000 of FIG. 10, according to some embodiments. In some embodiments, the training data 1105 for the NN 840 is used for an entire room equalization. The flow diagram 1110 proceeds to block 1112 where a LSP 805 may be measured in one or more rooms 101 to provide measurements for the SPL discrete frequencies in block 1113. In the one or more rooms 101, microphone 1020 may be used for taking measurements of the sound pressure using test signals, such as multi-tone, maximum length sequences, etc. In block 1114, depending on the implementation, selection, etc., the NN 840 (FIG. 10) using the input 845 provided from the microphone 1020, determines the estimated TSP in the room 101 or the estimated EA in an LA at discrete frequencies, which are provided in block 1115. In some embodiments, the remaining blocks 1116-1119 are similar to processing for blocks 916-919 of FIG. 9B as described above.

Figure 12:
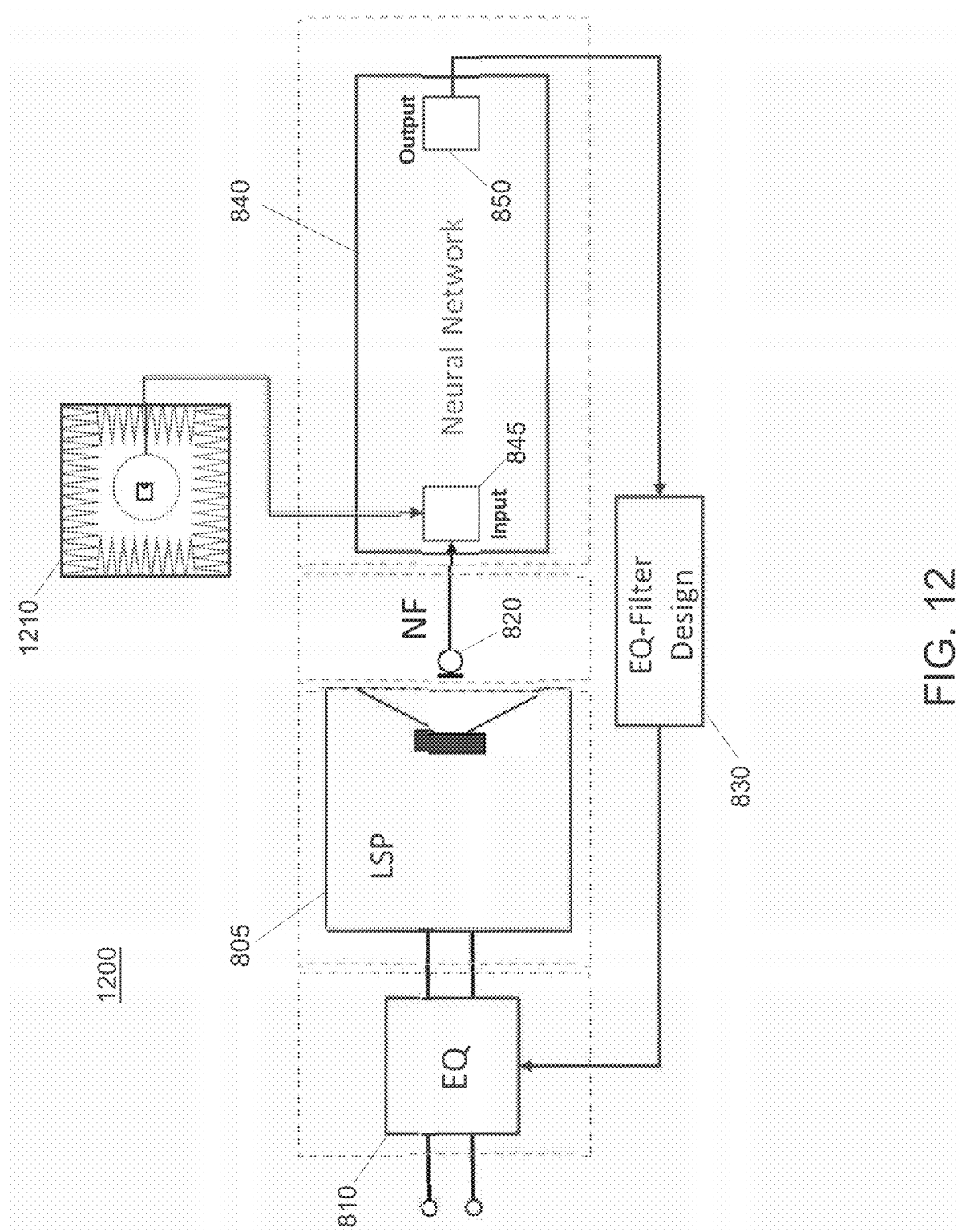
FIG. 12 illustrates a block diagram for still another speaker system including a NF microphone, anechoic response, a NN, an EQ-filter design and EQ, according to some embodiments.

FIG. 12 illustrates a block diagram for still another speaker system 1200 including a NF microphone 820, anechoic response 1210, a NN 840, an EQ-filter design 830 and EQ 810, according to some embodiments. An anechoic speaker chamber is a room that is arranged to completely absorb reflections of sound, and are typically isolated from sound waves entering from the surrounding environment. This setting provides direct sounds, in effect simulating being inside an infinitely large room. Typically, a room affects the response of both the speaker itself and the sound during its path from speaker to listener. In one or more embodiments, the anechoic response 1210 provides the LSP 805 a free field or 2pi response, room prediction based on the spatial response of the LSP 805, or its directivity, etc.

FIG. 13A illustrates a flow diagram 1300 for NN 840 training for the system 1200 of FIG. 12, according to some embodiments. For the training of the NN 840, the data 1305 (e.g., stored in a memory, etc.) includes the NF measurement frequency response (which is the input 845 (FIG. 12) for the NN 840) and the room sound power and anechoic or 2pi response. The training of the NN 840 starts at block 1301 where the data 1305 is input to the NN 840. The NN 840 processes the input 845 and proceeds to block 1311 of FIG. 13B.

FIG. 13B illustrates a flow diagram 1310 for NN 840 processing for the system 1200 of FIG. 12, according to some embodiments. The flow diagram 1310 proceeds to block 1312 where the LSP 805 acquires NF sound pressure from a test signal, which may be measured in one or more rooms 101 to provide the measurements along with the anechoic or 2pi response for the SPL discrete frequencies in block 1313. In the one or more rooms 101, the microphone 820 may be used for taking measurements of the sound pressure using test signals, such as multi-tone, maximum length sequences, etc. In block 1314, depending on the implementation, selection, etc., the NN 840 (FIG. 10) using the input 845 provided from the NF microphone 820 and the anechoic or 2pi response, determines the estimated TSP in the room 101 or the estimated EA in an LA at discrete frequencies, which are provided in block 1315. In some embodiments, the remaining blocks 1316-1319 are similar to processing for blocks 916-919 of FIG. 9B as described above.

FIG. 14A illustrates an example setup of a room 101 with a stereo setup including a first speaker system, LSP1 1405, with an NF microphone M1 1430 and a second speaker system, LSP2 1410, with an NF microphone M2 1435, and showing the LA 1420, according to some embodiments. The LSP1 1405 includes the NF microphone M1 1430 that is attached in front of the LSP1 1405 (e.g., in front of the driver), and the NF microphone M2 1435 that is attached in front of the LSP2 1410 (e.g., in front of the driver).

FIG. 14B illustrates an example setup of a room 101 with a first speaker system, LSP1 1406 showing multiple microphone placements and showing the LA 1420, according to some embodiments. In the single channel setup, the multiple microphones are positioned throughout room 101 around the LA 1420. The multiple microphones include microphone M1 1440, microphone M2 1441, microphone M3 1442 and microphone M4 1443.

FIG. 14C illustrates an example setup of a room 101 with multi-speaker systems each having a NF microphone and showing the LA 1420, according to some embodiments. The example setup may include, but is not limited to, front channel speakers, a center channel speaker and two surround or rear channel speakers. In this multi-channel setup, the multi-speaker systems are positioned around the room 101 around the LA 1420. The multi-speaker systems include: a first speaker system LSP1 1450 with an attached NF microphone M1 1430, a second speaker system LSP2 1451 with an attached NF microphone M2 1435, a third speaker system LSP3 1452 with an attached NF microphone M3 1436, a fourth speaker system LSP4 1453 with microphone M4 1437, and a fifth speaker system LSP5 1454 with an attached NF microphone M5 1438.

FIG. 15A illustrates a room 101 with the stereo setup of FIG. 14A including the first speaker system LSP1 1405 with an NF microphone M1 1430 and the second speaker system LSP2 1410 with an NF microphone M2 1435, and showing the estimated TSP 1460, according to some embodiments. The LSP1 1405 includes the NF microphone M1 1430 that is attached in front of the LSP1 1405 (e.g., in front of the driver), and the NF microphone M2 1435 that is attached in front of the LSP2 1410 (e.g., in front of the driver). In this example setup, the TSP 1460 or the average SPL produced by the speaker systems 1405 and 1410 in the room 101. The TSP 1460 would conventionally be measured with a large number of microphones randomly spaced in the room 101.

FIG. 15B illustrates a room 101 with a first speaker system LSP1 1406 showing multiple microphone placements and showing the estimated TSP 1461, according to some embodiments. In the single channel setup, the multiple microphones include microphone M1 1440, microphone M2 1441, microphone M3 1442 and microphone M4 1443.

FIG. 15C illustrates a room 101 with multi-speaker systems each having a NF microphone and showing the estimated TSP 1460, according to some embodiments. The example setup may include, but is not limited to, front channel speakers, a center channel speaker and two surround or rear channel speakers. The multi-speaker systems include: a first speaker system LSP1 1450 with an attached NF microphone M1 1430, a second speaker system LSP2 1451 with an attached NF microphone M2 1435, a third speaker system LSP3 1452 with an attached NF microphone M3 1436, a fourth speaker system LSP4 1453 with microphone M4 1437, and a fifth speaker system LSP5 1454 with an attached NF microphone M5 1438.

Figure 16:
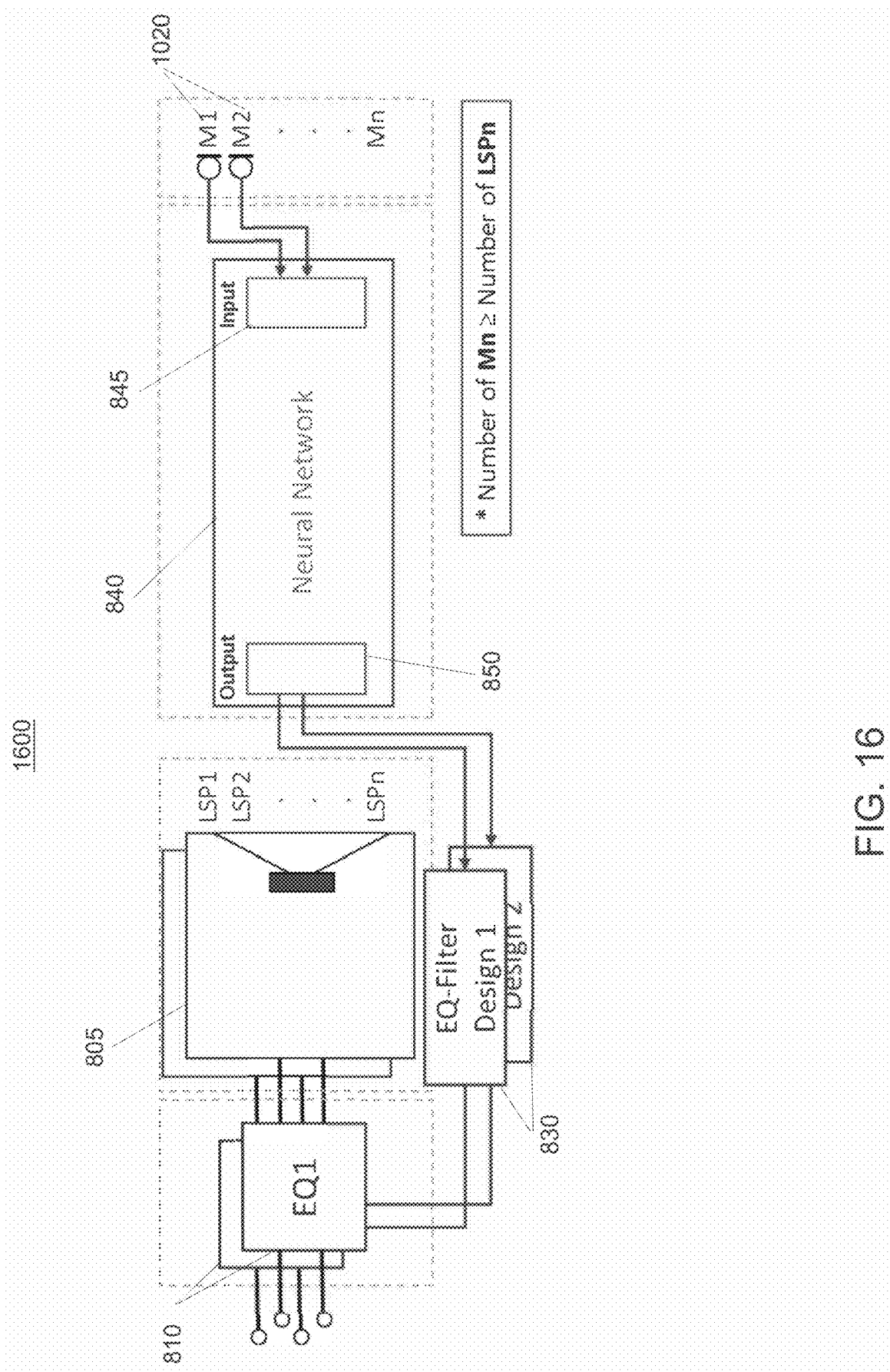
FIG. 16 illustrates a block diagram for a speaker system including one or more speakers, one or more microphones, one or more NNs, one or more EQ designs and one or more EQs, according to some embodiments.

FIG. 16 illustrates a block diagram for a speaker system 1600 including one or more speakers LSP1-N 805, one or more microphones 1-N 1020, one or more NNs 840, one or more EQ-filter designs 1-N 830 and one or more EQs 1-N 810, according to some embodiments. In one or more embodiments, the system 1600 is similar to the system 1000 of FIG. 10, as described above, with additional numbers of speakers LSP1-N 805, microphones 1-N 1020, EQ-filter designs 1-N 830 and EQs 1-N 810 that use the NN 840, where the number of microphones is greater or equal to the number of speakers 1-N 805. In one or more embodiments, each of the speakers LSP1-N 805 is paired with its own EQ-filter design 830 that is provided a separate output 850 from the NN 840, and is also paired with its own EQ 810.

Figures 17A, 17B:
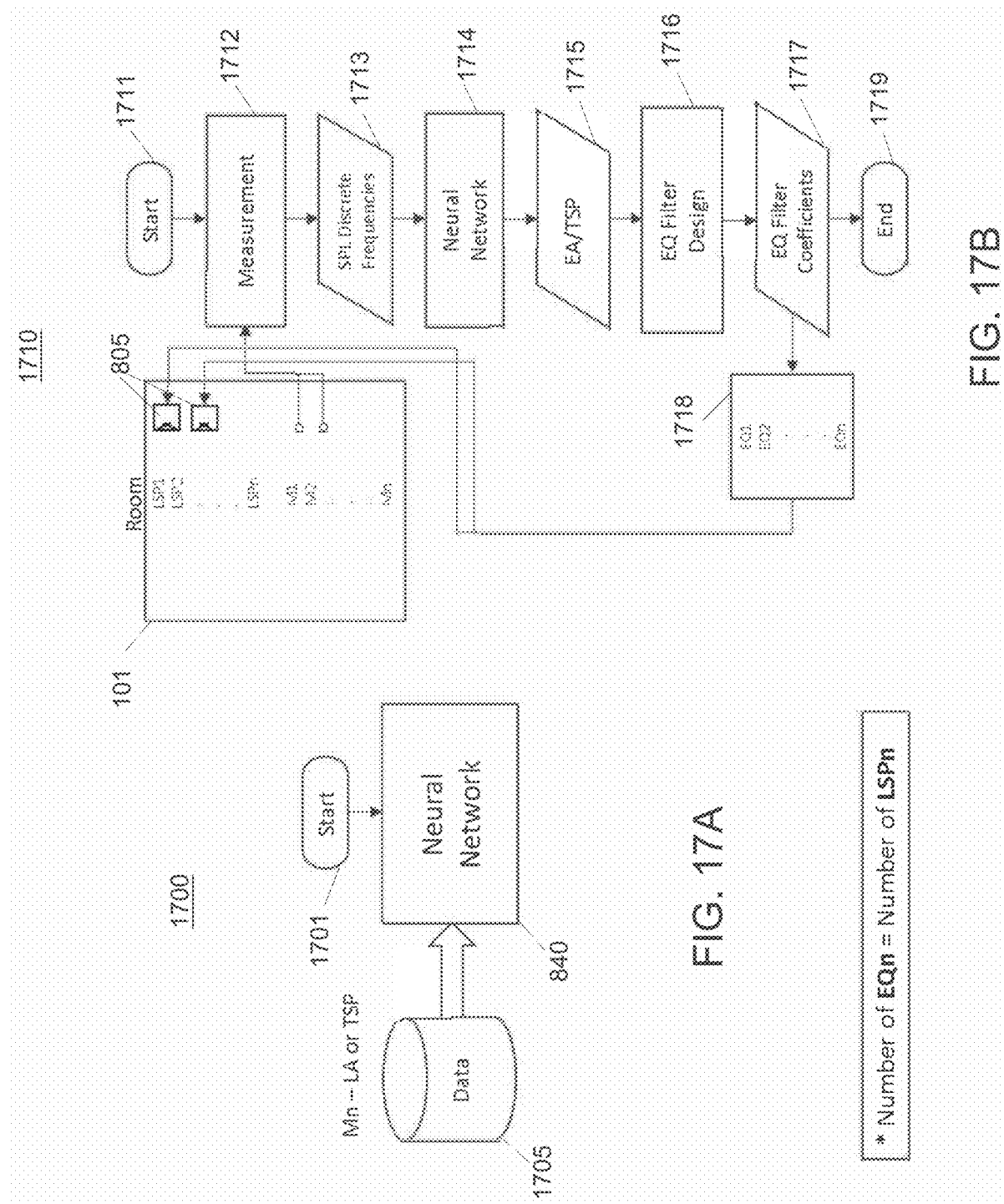
FIG. 17A illustrates a flow diagram for NN training for the system of FIG. 16, according to some embodiments.
FIG. 17B illustrates a flow diagram for NN processing for the system of FIG. 16, according to some embodiments.
Figure 18A:
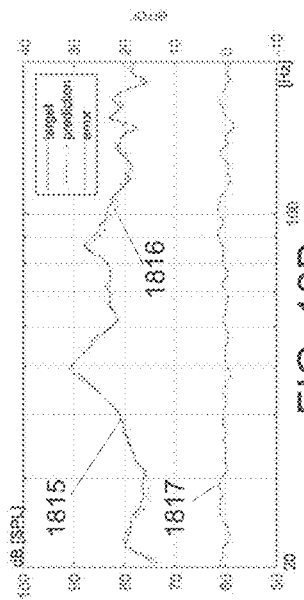
FIGS. 18A-D illustrate graphs of NN predictions for different rooms and speaker positions, according to some embodiments.
Figure 18C:
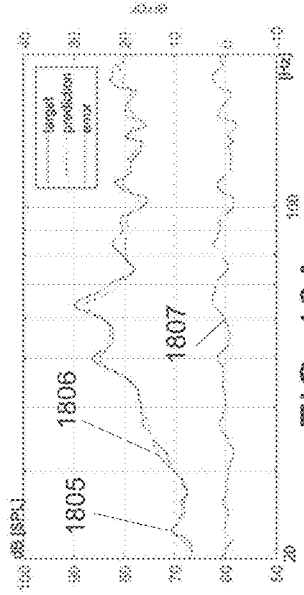
Figure 18B:
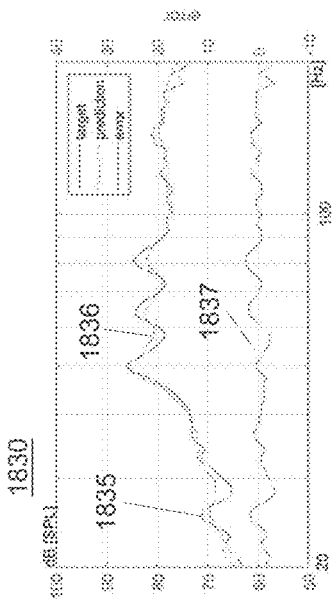
Figure 18D:
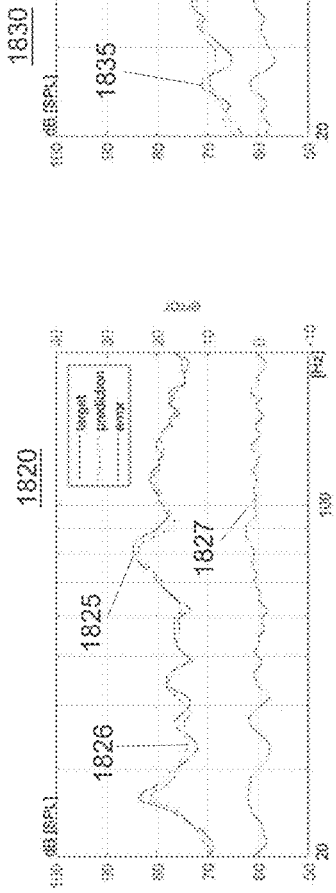

FIG. 17A illustrates a flow diagram 1700 for NN 840 training for the system of FIG. 16, according to some embodiments. For the training of the NN 840, the data 1705 (e.g., stored in a memory, etc.) includes the measurement frequency response (which is the input 845 (FIG. 16) for the NN 840) and the TSP in the room 101 or the EA in an LA at discrete frequencies (which is the output 850 (FIG. 16) of the NN 840 for each EQ-filter design 1-N 830 depending on the implementation, selection, etc.). The training of the NN 840 starts at block 1701 where the data 1705 is input to the NN 840. The NN 840 processes the input 845 and proceeds to block 1711 of FIG. 17B.

FIG. 17B illustrates a flow diagram 1710 for NN 840 processing for the system 1600 of FIG. 16, according to some embodiments. In one or more embodiments, the training data 1705 for the NN 840 is used for an entire room equalization. The flow diagram 1710 proceeds to block 1712 where the LSPs 805 1-N may be measured using the microphones 1-N 1020 in one or more rooms 101 to provide measurements for the SPL discrete frequencies in block 1713. In the one or more rooms 101, microphones 1-N 1020 may be used for taking measurements of the sound pressure using test signals, such as multi-tone, maximum length sequences, etc. In block 1714, depending on the implementation, selection, etc., the NN 840 (FIG. 16) using the input 845 provided from the microphones 1-N 1020, determines and outputs the estimated TSP in the room 101 or the estimated EA in an LA at discrete frequencies, which are provided in block 1715. In some embodiments, the remaining blocks 1716-1719 are similar to processing for blocks 916-919 of FIG. 9B as described above, with the EQ-filter designs 1-N 830 providing the EQ-filter coefficients in block 1717 to the EQs 1-N 810.

FIGS. 18A-D illustrate graphs (1800, 1810, 1820 and 1830) of NN predictions (1806, 1816, 1826 and 1836) for different rooms and speaker positions, according to some embodiments. For the graphs 1800, 1810, 1820 and 1830, the loudspeaker is a subwoofer with a near field microphone attached in front of the driver. The NN used is a feed forward NN, conformed with one hidden layer and one output layer. The NF frequency response is the input to the NN. The NN is trained with measurement data from the NF microphone. The training processing is in dB scale, and the final result is in dB SPL. The NF was normalized with the TSP. During the training process, Bayesian regularization was chosen for the training function. The mean squared error is calculated to evaluate the training performance. The training for the NN was processed with the 70% of the measurement data, test 15%, validation 15%, and the overall dataset was divided randomly into three (3) subsets: a training set, a test set, and a validation set. The mean squared error is calculated to evaluate the training performance. The TSP in the room at discrete frequencies is the target output.

The training data for the microphone measurements on the loudspeaker is measured in eleven (11) living rooms. In each living room, the loudspeaker was measured in four (4) to six (6) typical positions, for a total of sixty (60) cases. Nine microphones were randomly distributed within the living rooms obtained the measurements, from which the TSP is computed for each loudspeaker position.

For graph 1800 (for room 11 at a first position), the target SPL 1805 is plotted against the prediction SPL 1806, with the error 1807 shown with a standard deviation error of 1.13 dB. For graph 1810 (for room 3 at a second position), the target SPL 1815 is plotted against the prediction SPL 1816, with the error 1817 shown with a standard deviation error of 0.681 dB. For graph 1820 (for room 5 at a sixth position), the target SPL 1825 is plotted against the prediction SPL 1826, with the error 1827 shown with a standard deviation error of 1.15 dB. For graph 1830 (for room 6 at a second position), the target SPL 1835 is plotted against the prediction SPL 1836, with the error 1837 shown with a standard deviation error of 1.28 dB. As illustrated, the example embodiment tested performed well with small errors for the NN predictions.

Figure 19:
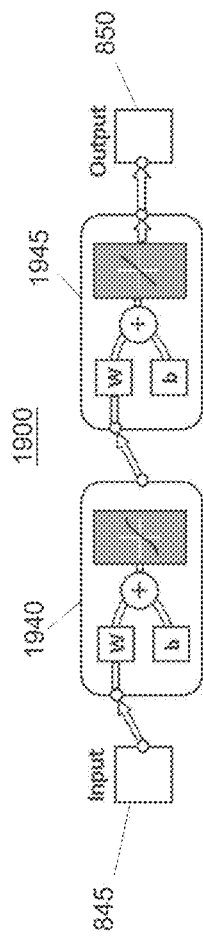
FIG. 19 illustrates an example NN structure for speaker systems, according to some embodiments.

FIG. 19 illustrates an example NN structure 1900 for speaker systems, according to some embodiments. In one or more embodiments, the NN structure 1900 is a feedforward (also known as deep networks, multi-layer perceptron (MLP), and simply NN) NN. In some embodiments, the NN 1900 includes an input 845 (or input layer), which includes of the neurons that receive the input 845 and passes this on to the other layers. The number of neurons in the input 845 should be equal to the attributes or features in the dataset. The output 850 (or output layer) is the predicted feature and depends on the type of machine learning model being built. The hidden layers 1940 and 1945 are between the input 845 and output 850. The hidden layers 1940 and 1945 contain a vast number of neurons that apply transformations to the input 845 before passing them forward. As the NN 1900 is trained, the neuron weights (indicated as w) are updated to be more predictive. The neuron weights refer to the strength or amplitude of a connection between two neurons. The neuron weights are often initialized to small random values, such as values in the range 0 to 1. The activation function is the mapping of summed weighted input to the output of the neuron. The activation (or transfer) function governs the inception at which the neuron is activated and the strength of the output 850 (or output signal). The weighted sum obtained is turned into an output 850 by feeding the weighted sum into the activation function. The activation functions commonly used are relu, tanh and soft max.

FIGS. 20A-C illustrate examples 2000, 2010 and 2020 of where a speaker 805 system is placed at a single position with a microphone that is placed at multiple positions (2020, 2025 and 2030) with respect to the LA 2010, according to some embodiments. For these examples, the target is the LA 2010 and the speaker system is a stereo system (left and right front channels). In example 2000, the microphone 2020 is placed on the perimeter of the LA 2010 at a distance to the speaker 805. In example 2010, the microphone 2025 is placed within the perimeter of the LA 2010 at a distance to the speaker 805. In example 2020, the microphone 2030 is placed outside of the perimeter of the LA 2010 at a distance to the speaker 805.

FIGS. 21A-C illustrate graphs 2100, 2110 and 2120 of NN predictions for the respective configurations shown in FIGS. 20A-C, according to some embodiments. In graph 2100, where the microphone 2020 (FIG. 20A) is positioned at the right channel NF and LA and the left channel is active. The target curve 2105 is shown over the prediction curve and also shown is the input (right NF response) curve 2106 and error curve 2107. The error curve 2107 averages at about 0.317 dB. In graph 2110, where the microphone 2020 (FIG. 20B) is positioned at the right channel NF and LA (right displaced 30 cm inside the LA 2010) and the left channel is active. The target curve 2115 is shown over the prediction curve (dashed line) and also shown is the input (right NF response) curve 2116 and error curve 2117. The error curve 2117 averages at about 2.96 dB. In graph 2120, where the microphone 2030 (FIG. 20C) is positioned at the right channel NF and LA and the left channel is active. The target curve 2125 is shown over the prediction curve and also shown is the input (right NF response) curve 2126 and error curve 2127. The error curve 2127 averages at about 0.427 dB. The error results of the prediction tend to show that the position of the microphone 2020 has better results that the positions of the microphones 2025 and 2030.

FIGS. 22A-C illustrate examples 2200, 2210 and 2220 of a speaker 805 system placed at multiple positions with a microphone placed at multiple positions with respect to the LA 2205, according to some embodiments. For these examples, the target is the LA 2205 and the speaker system is a stereo system (left and right front channels). In example 2200, the microphone 2215 is placed on the perimeter of the LA 2205 at a distance to the speaker 805 that is placed on the perimeter of the LA 2205. In example 2210, the microphone 2225 is placed on the perimeter of the LA 2205 at a distance to the speaker 805 that is placed outside of the perimeter of the LA 2205. In example 2220, the microphone 2230 is placed within the perimeter of the LA 2205 at a distance to the speaker 805 that is placed outside of the perimeter of the LA 2205.

FIGS. 23A-C illustrate graphs 2300, 2310 and 2320 of NN predictions for the respective configurations shown in FIGS. 22A-C, according to some embodiments. In graph 2300, where the microphone 2215 (FIG. 22A) is positioned at the right channel NF and LA, the speaker 805 is displaced 30 cm within the perimeter of the LA 2205, and the left channel is active. The target curve 2305 is shown over the prediction curve (dashed line) and also shown is the input (right NF response) curve 2306 and error curve 2307. The error curve 2307 averages at about 0.467 dB. In graph 2310, where the microphone 2225 (FIG. 22B) is positioned at the right channel NF and LA, the speaker 805 is displaced 30 cm outside the perimeter of the LA 2205, and the left channel is active. The target curve 2315 is shown over the prediction curve (dashed line) and also shown is the input (right NF response) curve 2316, and error curve 2317. The error curve 2317 averages at about 1.88 dB. In graph 2320, where the microphone 2230 (FIG. 22C) is positioned at the right channel NF and LA (right displaced 30 cm inside the LA 2205), the speaker 805 is displaced 30 cm outside the perimeter of the LA 2205, and the left channel is active. The target curve 2325 is shown over the prediction curve (dashed line) and also shown is the input (right NF response) curve 2326 and error curve 2327. The error curve 2327 averages at about 0.46 dB. The error results of the prediction tend to show that the position of the microphone and the position of the speaker 805 affect the error results, which may be leveraged for directing a user on placement of the speaker 805 and microphones.

FIGS. 24A-C illustrate examples 2400, 2410 and 2420 of a speaker 805 system placed at multiple positions with multiple microphones placed at multiple positions with respect to the LA 2405, according to some embodiments. For these examples, the target is the LA 2405 and the system is a 5.1 speaker system (left and right front channels, a center channel, two rear or surround speakers and one subwoofer). In example 2400, the microphones 2415, 2416, 2417 and 2418 are placed on the perimeter of the LA 2405 at a distance to the speaker 805, which is also placed outside of the perimeter of the LA 2405. In example 2410, the microphones 2425 and 2426 are placed on the perimeter of the LA 2405 at a distance to the speaker 805 that is placed outside of the perimeter of the LA 2405 at a different position than in the example 2400. In this example 2410, the microphones 2425 and 2426 are arranged at different positions than the microphones 2415 and 2416 of example 2400, while microphones 2427 and 2428 are placed in similar positions as microphones 2418 and 2417 of example 2400. In example 2420, the microphones 2430, 2431 and 2432 are placed on the perimeter of the LA 2405 at a distance to the speaker 805 that is placed on the perimeter of the LA 2405 at a different position than in the examples 2400 and 2420. In this example 2420, the microphones 2432, 2430 and 2431 are arranged at similar positions as the microphones 2428, 2425 and 2426 of example 2410, while microphone 2433 of example 2420 and microphone 2427 of example 2410 are placed in different positions.

FIGS. 25A-C illustrate graphs 2500, 2510 and 2520 of NN predictions for the respective configurations in FIGS. 24A-C, according to some embodiments. In graph 2500, the left channel speaker 805 does not have a microphone activated, the microphone 2415 (FIG. 24A) is positioned near the center channel, the microphone 2416 is placed near the right front channel, the microphone 2417 is positioned near the right rear channel, and the microphone 2418 is positioned near the left rear channel. The target curve 2505 is shown over the prediction curve (dashed line) and also shown is the input (NF response) curve 2506 and error curve 2507. The error curve 2507 averages at about 0.744 dB. In graph 2510, the center channel speaker 805 does not have a microphone, and the microphone 2425 (FIG. 24B) is positioned near the right front channel, the microphone 2428 is placed near the left front channel, the microphone 2426 is positioned near the right rear channel and the microphone 2427 is positioned near the left rear channel. The target curve 2515 is shown over the prediction curve (dashed line) and also shown is the input (NF response) curve 2516 and error curve 2517. The error curve 2517 averages at about 0.0586 dB. In graph 2520, the left rear channel speaker 805 does not have a microphone, and the microphone 2430 (FIG. 24C) is positioned near the right front channel, the microphone 2432 is placed near the left front channel, the microphone 2433 is positioned near the center channel, and the microphone 2431 is positioned near the right rear channel. The target curve 2525 is shown over the prediction curve (dashed line) and also shown is the input (NF response) curve 2526 and error curve 2527. The error curve 2527 averages at about 0.264 dB. The error results of the prediction tend to show that the position of the microphone and the position of the speaker 805 effect the error results, which may be leveraged for directing a user on placement of the speaker 805 and microphones.

FIGS. 26A-C illustrate examples 2600, 2610 and 2620 of a speaker 805 system placed at multiple positions with multiple microphones placed at multiple positions with respect to the LA 2605, according to some embodiments. For these examples, the target is the LA 2605 and the system is a 5.1 speaker system (left and right front channels, a center channel, two rear or surround speakers and one subwoofer). In example 2600, the microphones 2618, 2615 and 2616 are placed on the perimeter of the LA 2605 at a distance to the speaker 805, which is also placed on the perimeter of the LA 2605. Microphone 2617 is placed outside of the LA 2605. In example 2610, the microphones 2625, 2626, 2627 and 2628 are placed on the perimeter of the LA 2605 at a distance to the speaker 805 that is placed outside of the perimeter of the LA 2605 at a different position than in the example 2600. In this example 2610, the microphones 2628 and 2625 are arranged at different positions than the microphones 2617 and 2618 of example 2600, while microphones 2626 and 2627 are placed in similar positions as microphones 2615 and 2616 of example 2600. In example 2620, the microphones 2633, 2630 and 2631 are placed on the perimeter of the LA 2605 at a distance to the speaker 805 that is placed on the perimeter of the LA 2605 at a different position than in the examples 2600 and 2610. In this example 2620, the microphones 2630 and 2631 are arranged at similar positions as the microphones 2625 and 2626 of example 2610, while microphones 2632 and 2633 of example 2620 and microphones 2627 and 2628 of example 2610 are placed in different positions.

FIGS. 27A-C illustrate graphs 2700, 2710 and 2720 of NN predictions for the respective configurations in FIGS. 26A-C, according to some embodiments. In graph 2700, the right channel speaker 805 does not have a microphone, the microphone 2618 (FIG. 26A) is positioned near the center channel, the microphone 2617 is displaced by the left front channel, the microphone 2615 is positioned near the right rear channel and the microphone 2616 is positioned near the left rear channel. The target curve 2705 is shown over the prediction curve (dashed line) and also shown is the input (NF response) curve 2706 and error curve 2707. The error curve 2707 averages at about 0.0014 dB. In graph 2710, the center channel speaker 805 does not have a microphone and is displaced from the LA 2605, the microphone 2625 is positioned near the right front channel, microphone 2626 is positioned near the right rear channel, microphone 2627 is positioned near the left rear channel and microphone 2628 is positioned near the left front channel. The target curve 2715 is shown over the prediction curve (dashed line) and also shown is the input (NF response) curve 2716 and error curve 2717. The error curve 2717 averages at about 0.085 dB. In graph 2720, the left rear channel speaker 805 does not have a microphone, the microphone 2630 (FIG. 26C) is positioned near the right front channel, the microphone 2632 is displaced by the left front channel, the microphone 2633 is positioned near the center channel, and the microphone 2631 is positioned near the right rear channel. The target curve 2725 is shown over the prediction curve (dashed line) and also shown is the input (NF response) curve 2726 and error curve 2727. The error curve 2727 averages at about 0.54 dB. The error results of the prediction tend to show that the position of the microphone and the position of the speaker 805 effect the error results, which may be leveraged for directing a user on placement of the speaker 805 and microphones.

FIGS. 28A-C illustrate examples 2800, 2810 and 2820 of a speaker system placed at a single position with a microphone placed at multiple positions with respect to TSP, and the LA 2805 is the dashed boundary, according to some embodiments. For these examples, the target is the TSP, and the speaker system is a stereo system (left and right front channels). In example 2800, the microphone 2815 is placed on the perimeter of the LA 2805 at a distance to the speaker 805, which does not have a microphone. In example 2810, the microphone 2825 is placed within the perimeter of the LA 2805 at a distance to the speaker 805. In example 2820, the microphone 2830 is placed outside of the perimeter of the LA 2805 at a distance to the speaker 805.

FIGS. 29A-C illustrate graphs 2900, 2910 and 2920 of NN predictions for the respective configurations in FIGS. 28A-C, according to some embodiments. In graph 2900, where the microphone 2815 (FIG. 28A) is positioned at the right channel and the left channel is active. The target curve 2905 is shown over the prediction curve (dashed line) and also shown is the input (right NF response) curve 2906 and error curve 2907. The error curve 2907 averages at about 0.208 dB. In graph 2910, where the microphone 2825 (FIG. 28B) is positioned at the right channel within the LA 2805 and the left channel is active. The target curve 2915 is shown over the prediction curve (dashed line) and also shown is the input (right NF response) curve 2916 and error curve 2917. The error curve 2917 averages at about 0.449 dB. In graph 2920, where the microphone 2830 (FIG. 28C) is positioned at the right channel and displaced 30 cm outside the LA 2805, and the left channel is active. The target curve 2925 is shown over the prediction curve (dashed line) and also shown is the input (right NF response) curve 2926 and error curve 2927. The error curve 2927 averages at about 0.246 dB. The error results of the prediction tend to show that the position of the microphone 2815 has better results that the positions of the microphones 2825 and 2830.

FIGS. 30A-C illustrate examples 3000, 3010 and 3020 for a speaker 805 system placed at multiple positions with multiple microphones placed at multiple positions with respect to a LA 3005, according to some embodiments. For these examples, the target is the TSP within the LA 3005 and the system is a 5.1 speaker system (left and right front channels, a center channel, two rear or surround speakers and one subwoofer). In example 3000, the microphones 3018, 3015, 3016 and 3017 are placed on the perimeter of the LA 3005 at a distance to the speaker 805, which is also placed on the perimeter of the LA 3005 at the left front channel position. In example 3010, the microphones 3025, 3026, 3027 and 3028 are placed on the perimeter of the LA 3005 at a distance to the speaker 805 that is placed outside of the perimeter of the LA 3005 at a center channel position. In example 3020, the microphones 3030, 3031, 3032 and 3033 are placed on the perimeter of the LA 3005 at a distance to the speaker 805 that is placed on the perimeter of the LA 3005 at a different position than in the examples 3000 and 3010.

FIGS. 31A-C illustrate graphs 3100, 3110 and 3120 of NN predictions for the respective configurations in FIGS. 30A-C, according to some embodiments. In graph 3100, where the microphone 3018 (FIG. 30A) is positioned at the center channel, microphone 3015 is positioned near the front right channel, microphone 3016 is positioned near the rear right channel, and microphone 3017 is positioned near the left rear channel. The target curve 3105 is shown over the prediction curve (dashed line) and also shown is the input (NF response) curve 3106 and error curve 3107. The error curve 3107 averages at about 0.888 dB. In graph 3110, where the microphone 3025 (FIG. 30B) is positioned near the right front channel, microphone 3028 is positioned near the front left channel, microphone 3026 is positioned near the right rear channel, and microphone 3027 is positioned near the rear left channel. The target curve 3115 is shown over the prediction curve (dashed line) and also shown is the input (NF response) curve 3116 and error curve 3117. The error curve 3117 averages at about 0.463 dB. In graph 3120, where the microphone 3032 (FIG. 30C) is positioned at the left front channel, microphone 3033 is positioned near the center channel, microphone 3030 is positioned near the left front channel and microphone 3031 is positioned near the rear right channel. The target curve 3125 is shown over the prediction curve (dashed line) and also shown is the input (NF response) curve 3126 and error curve 3127. The error curve 3127 averages at about 0.651 dB. The error results of the prediction tend to show that the setup for example 3010 has better results than the examples 3000 and 3033.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of pre-AIA 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the embodiments has been presented for purposes of illustration and description, but is not intended to be exhaustive or limited to the embodiments in the form disclosed. Many modifications and variations will be apparent to those of ordinary skill in the art without departing from the scope and spirit of the invention.

Though the embodiments have been described with reference to certain versions thereof; however, other versions are possible. Therefore, the spirit and scope of the appended claims should not be limited to the description of the preferred versions contained herein.

What is claimed is:

1. A computer-implemented method comprising:
  acquiring, via at least one microphone, sound pressure data at one or more discrete frequencies obtained from a frequency response of a loudspeaker in a room;
  inputting the sound pressure data into an artificial intelligence (AI) model, wherein the AI model analyses and processes information for a learned relationship between the frequency response and at least one of energy average (EA) training data or total sound power (TSP) training data, and incorporates the relationship between the frequency response and at least one of an EA in a listening area or a TSP produced by the loudspeaker; and
  automatically estimating, via the AI model and without user interaction, the at least one of the EA in the listening area or the TSP produced by the loudspeaker; wherein the AI model comprises a neural network (NN), and the NN is trained prior to automatically estimating the at least one of the EA in the listening area or the TSP produced by the loudspeaker.

2. The method of claim 1, wherein the at least one microphone is outside the listening area.

3. The method of claim 2, further comprising:
  designing the equalization filter based on output data of the NN, wherein the equalization filter is designed prior to applying the equalization filter.

4. The method of claim 2, further comprising:
  inputting anechoic response data or 2pi data into the NN for learning the relationship between the frequency response and the at least one of the EA in the listening area or the TSP.

5. The method of claim 2, wherein:
  the training of the NN comprises, at each of one or more loudspeaker positions in the room, acquiring, via the at least one microphone, sound pressure training data and at least one of the EA training data or the TSP training data.

6. The method of claim 1, wherein the frequency response is a near field (NF) response.

7. The method of claim 1, further comprising:
  applying an equalization filter to compensate the frequency response towards a desired EA or TSP target response.

8. A loudspeaker system comprising:
  a loudspeaker coupled to an equalization filter;
  at least one microphone configured to acquire sound pressure data at one or more discrete frequencies obtained from a frequency response of the loudspeaker in a room; and
  an artificial intelligence (AI) model coupled with the at least one microphone, the AI model analyses and processes information, and is trained for learning the relationship between the frequency response and at least one of energy average (EA) training data or total sound power (TSP) training data;
  wherein:
    the sound pressure data is input into the AI model;
    the AI model incorporates a relationship between the frequency response and at least one of an EA in a listening area or a TSP produced by the loudspeaker;
    the AI model comprises a neural network (NN); and
    the NN is trained prior to automatically estimating the at least one of the EA in the listening area or the TSP produced by the loudspeaker.

9. The loudspeaker system of claim 8, wherein the at least one microphone is positioned outside the listening area.

10. The loudspeaker system of claim 9, wherein the equalization filter is designed based on output data of the NN prior to being applied.

11. The loudspeaker system of claim 9, wherein anechoic response data or 2pi data is input into the NN for learning the relationship between the frequency response and the at least one of the EA in the listening area or the TSP.

12. The loudspeaker system of claim 9, wherein:
the loudspeaker is configured to acquire, via the at least one microphone, sound pressure training data and at least one of the EA training data or the TSP training data.

13. The loudspeaker system of claim 8, wherein the frequency response is a near field (NF) response.

14. The loudspeaker system of claim 8, wherein the equalization filter is configured to compensate the frequency response towards a desired EA or TSP target response.

15. A loudspeaker system comprising:
a plurality of loudspeakers;
a plurality of equalization filters, each equalization filter coupled to a particular one of the plurality of loudspeakers;
a plurality of microphones, each of the plurality of microphones being configured to acquire sound pressure data at one or more discrete frequencies obtained from a frequency response of the particular one loudspeaker of the plurality of loudspeakers in a room; and
an artificial intelligence (AI) model coupled with each of the plurality of microphones, the AI model analyses and processes information, and is trained for learning the relationship between the frequency response and at least one of energy average (EA) training data or total sound power (TSP) training data;
wherein:
the sound pressure data is input into the AI model;
the AI model incorporates a relationship between the frequency response and at least one of an EA in a listening area or a TSP produced by each of the plurality of loudspeakers;
the AI model comprises a neural network (NN); and
the NN is trained prior to automatically estimating the at least one of the EA in the listening area or the TSP produced by the loudspeaker.

16. The loudspeaker system of claim 15, wherein at least one of the plurality of microphones is positioned outside the listening area.

17. The loudspeaker system of claim 16, wherein each of the plurality of equalization filters is configured to compensate the frequency response towards a desired EA or TSP target response and are each designed based on output data of the NN prior to being applied.

18. The loudspeaker system of claim 16, wherein anechoic response data or 2pi data is input into the NN for learning the relationship between the frequency response and the at least one of the EA in the listening area or the TSP.

19. The loudspeaker system of claim 16, wherein:
each of the plurality of loudspeakers is configured to acquire, via at least the particular one microphone of the plurality of microphones, sound pressure training data and at least one of the EA training data or the TSP training data.

20. The loudspeaker system of claim 15, wherein the frequency response is a near field (NF) response.

* * * * *